United States Patent
Kebler et al.

(10) Patent No.: US 10,554,425 B2
(45) Date of Patent: Feb. 4, 2020

(54) MAXIMALLY REDUNDANT TREES TO REDUNDANT MULTICAST SOURCE NODES FOR MULTICAST PROTECTION

(71) Applicant: Juniper Networks, Inc., Sunnyvale, CA (US)

(72) Inventors: Robert W. Kebler, Newburyport, MA (US); Vikram Nagarajan, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 255 days.

(21) Appl. No.: 15/663,566

(22) Filed: Jul. 28, 2017

(65) Prior Publication Data

US 2019/0036717 A1 Jan. 31, 2019

(51) Int. Cl.
| | |
|---|---|
| *H04L 12/18* | (2006.01) |
| *H04L 12/44* | (2006.01) |
| *H04L 12/761* | (2013.01) |
| *H04L 29/06* | (2006.01) |
| *H04L 12/40* | (2006.01) |
| *H04L 12/721* | (2013.01) |
| *H04W 40/02* | (2009.01) |

(52) U.S. Cl.
CPC ............. *H04L 12/18* (2013.01); *H04L 12/44* (2013.01); *H04L 45/16* (2013.01); *H04L 65/4076* (2013.01); *H04L 12/40176* (2013.01); *H04L 45/12* (2013.01); *H04W 40/026* (2013.01)

(58) Field of Classification Search
CPC .. H04W 40/026; H04L 12/18; H04L 12/1877; H04L 12/44; H04L 12/40176; H04L 45/00; H04L 45/16; H04L 45/12; H04L 65/4076

See application file for complete search history.

(56) References Cited

U.S. PATENT DOCUMENTS

| | | | |
|---|---|---|---|
| 6,032,194 A | 2/2000 | Gai et al. | |
| 6,556,541 B1 | 4/2003 | Bare | |
| 6,721,275 B1 | 4/2004 | Rodeheffer et al. | |
| 6,732,182 B1* | 5/2004 | Beverly, IV | H04L 12/18 370/244 |

(Continued)

FOREIGN PATENT DOCUMENTS

WO 2010055408 A1 5/2010

OTHER PUBLICATIONS

Enyedi et al., "On Finding Maximally Redundant Trees in Linear Time," Department of Telecommunications and Media Informatics, Budapest University of Technology and Economics, IEEE Symposium on Computers and Communications (ISCC), Aug. 2009, 11 pp.

(Continued)

*Primary Examiner* — Alpus Hsu
*Assistant Examiner* — Camquyen Thai
(74) *Attorney, Agent, or Firm* — Shumaker & Sieffert, P.A.

(57) ABSTRACT

In general, techniques are described for enabling a network of network devices (or "nodes") to provide redundant multicast streams from redundant multicast sources to an egress network node. In some examples, the egress network node (or a controller for the network) computes maximally redundant trees (MRTs) from the egress network node to a virtual proxy node virtually added to the network topology by the egress network node for redundant multicast sources of redundant multicast streams.

21 Claims, 7 Drawing Sheets

(56) References Cited

U.S. PATENT DOCUMENTS

| | | | |
|---|---|---|---|
| 7,630,298 | B2 | 12/2009 | Shand et al. |
| 7,821,972 | B1 | 10/2010 | Finn et al. |
| 7,990,893 | B1 | 8/2011 | Singh |
| 8,165,121 | B1 | 4/2012 | Singh |
| 8,274,989 | B1 | 9/2012 | Allan et al. |
| 8,351,418 | B2 | 1/2013 | Zhao |
| 8,533,280 | B1* | 9/2013 | Clarke .............. H04L 67/2852 709/207 |
| 8,611,346 | B1* | 12/2013 | Wijnands ............ H04L 12/185 370/312 |
| 8,634,289 | B2 | 1/2014 | Bejerano et al. |
| 8,861,340 | B1 | 10/2014 | Atlas |
| 8,958,286 | B1* | 2/2015 | Atlas ...................... H04L 12/18 370/225 |
| 9,100,328 | B1 | 8/2015 | Atlas |
| 9,246,801 | B1 | 1/2016 | Kompella |
| 9,270,426 | B1 | 2/2016 | Atlas |
| 9,571,387 | B1* | 2/2017 | Atlas ...................... H04L 45/50 |
| 9,860,110 | B2* | 1/2018 | Singh .................. H05K 999/99 |
| 2002/0167898 | A1 | 11/2002 | Thang et al. |
| 2003/0152024 | A1 | 8/2003 | Yang et al. |
| 2004/0105390 | A1 | 6/2004 | Saksio |
| 2004/0190454 | A1 | 9/2004 | Higasiyama |
| 2004/0252634 | A1 | 12/2004 | Regan et al. |
| 2004/0258409 | A1 | 12/2004 | Sadananda |
| 2005/0036500 | A1 | 2/2005 | Rodeheffer et al. |
| 2005/0073958 | A1 | 4/2005 | Atlas |
| 2005/0135276 | A1 | 6/2005 | Bouchat et al. |
| 2006/0050690 | A1 | 3/2006 | Epps et al. |
| 2006/0087965 | A1 | 4/2006 | Shand et al. |
| 2006/0221866 | A1* | 10/2006 | Shepherd .............. H04L 45/00 370/255 |
| 2007/0211730 | A1 | 9/2007 | Cuthbert et al. |
| 2008/0031130 | A1 | 2/2008 | Raj et al. |
| 2008/0107027 | A1 | 5/2008 | Allan et al. |
| 2008/0123524 | A1 | 5/2008 | Vasseur et al. |
| 2008/0123533 | A1 | 5/2008 | Vasseur et al. |
| 2008/0219272 | A1 | 9/2008 | Novello et al. |
| 2009/0010272 | A1 | 1/2009 | Wijnands et al. |
| 2009/0180400 | A1 | 7/2009 | Chiabaut et al. |
| 2009/0185478 | A1 | 7/2009 | Zhang |
| 2009/0219806 | A1 | 9/2009 | Chen et al. |
| 2010/0080120 | A1 | 4/2010 | Bejerano et al. |
| 2010/0177631 | A1 | 7/2010 | Chen et al. |
| 2010/0182937 | A1 | 7/2010 | Bellagamba |
| 2010/0271936 | A1 | 10/2010 | Allan et al. |
| 2011/0051726 | A1* | 3/2011 | Bejerano ............ H04L 12/1877 370/390 |
| 2011/0051727 | A1 | 3/2011 | Cai et al. |
| 2011/0069609 | A1 | 3/2011 | Le Roux et al. |
| 2011/0158128 | A1 | 6/2011 | Bejerano et al. |
| 2011/0199891 | A1 | 8/2011 | Chen |
| 2011/0211445 | A1 | 9/2011 | Chen |
| 2011/0286336 | A1 | 11/2011 | Vasseur et al. |
| 2012/0039164 | A1 | 2/2012 | Enyedi et al. |
| 2012/0044837 | A1 | 2/2012 | Ibanez Fernandez et al. |
| 2012/0281524 | A1 | 11/2012 | Farkas |
| 2013/0033978 | A1* | 2/2013 | Eckert .................... H04L 45/16 370/216 |
| 2013/0077475 | A1 | 3/2013 | Enyedi et al. |
| 2013/0089094 | A1 | 4/2013 | Csaszar et al. |
| 2013/0121169 | A1 | 5/2013 | Zhao et al. |
| 2013/0232259 | A1 | 9/2013 | Csaszar et al. |
| 2013/0322231 | A1 | 12/2013 | Csaszar et al. |
| 2014/0016457 | A1 | 1/2014 | Enyedi et al. |

OTHER PUBLICATIONS

Atlas et al., "An Architecture for IP/LDP Fast-Reroute Using Maximally Redundant Trees, draft-atlas-rtgwg-mrt-frr-architecture-01," Internet-Draft, Routing Area Working Group, Oct. 31, 2011, 27 pp.

Karan et al., "Multicast only Fast Re-Route, draft-karan-mofrr-00," Internet-Draft, Network Working Group, Mar. 2, 2009, 14 pp.

Wei et al., "Tunnel Based Multicast Fast Reroute (TMFRR) Extensions to PIM, draft-lwei-pim-tmfrr-00.txt," Internet-Draft, Network Working Group, Oct. 16, 2009, 20 pp.

Lindem et al., "Extensions to IS-IS and OSPF for Advertising Optional Router Capabilities, draft-raggarwa-igp-cap-01.txt," Internet-Draft, Network Working Group, Nov. 2002, 12 pp.

Shen et al., "Discovering LDP Next-Nexthop Labels, draft-shen-mpls-ldp-nnhop-label-02.txt," Internet-Draft, Network Working Group, May 2005, 9 pp.

Enyedi et al., "IP Fast ReRoute: Lightweight Not-Via without Additional Addresses," Department of Telecommunications and Media Informatics, Budapest University of Technology and Economics, Proceedings of IEEE INFOCOM, Apr. 19-25, 2009, 5 pp.

Lindem et al., "Extensions to OSPF for Advertising Optional Router Capabilities," RFC 4970, Network Working Group, Jul. 2007, 13 pp.

Boers et al., "The Protocol Independent Multicast (PIM) Join Attribute Format," RFC 5384, Network Working Group, Nov. 2008, 11 pp.

Enyedi, "Novel Algorithms for IP Fast ReRoute," Department of Telecommunications and Media Informatics, Budapest University of Technology and Economics Ph.D. Thesis, Feb. 2011, 114 pp.

Atlas et al., "An Architecture for Multicast Protection Using Maximally Redundant Trees, draft-atlas-rtgwg-mrt-mc-arch-00," Internet-Draft, Routing Area Working Group, Mar. 2, 2012, 26 pp.

Atlas et al., "Algorithms for computing Maximally Redundant Trees for IP/LDP Fast ReRoute, draft-enyedi-rtgwg-mrt-frr-algorithm-01," Internet-Draft, Routing Area Working Group, Nov. 28, 2011, 39 pp.

Minei et al., "Label Distribution Protocol Extensions for Point-to-Multipoint and Multipoint-to-Multipoint Label Switched Paths, draft-ietf-mpls-ldp-p2mp-15," Internet-Draft, Network Working Group, Aug. 4, 2011, 40 pp.

Cai et al., "PIM Multi-Topology ID (MT-ID) Join Attribute, draft-ietf-pim-mtid-10.txt," Internet Draft, IETF, Sep. 27, 2011, 14 pp.

Atlas et al., "Basic Specification for IP Fast ReRoute: Loop-Free Alternates," RFC 5286, Network Working Group, Sep. 2008, 32 pp.

Shand et al., "IP Fast ReRoute Framework," RFC 5714, Internet Engineering Task Force (IETF), Jan. 2010, 16 pp.

Shand et al., "IP Fast ReRoute Using Not-via Addresses, draft-ietf-rtgwg-ipfrr-notvia-addresses-07," Internet-Draft, Network Working Group, Apr. 20, 2011, 29 pp.

Filsfils et al., "LFA applicability in SP networks, draft-ietf-rtgwg-lfa-applicability-03," Internet-Draft, Network Working Group, Aug. 17, 2011, 33 pp.

Francois et al., "Loop-free convergence using oFIB, draft-ietf-rtgwg-ordered-fib-05," Internet-Draft, Network Working Group, Apr. 20, 2011, 24 pp.

Rétvári et al., "IP Fast ReRoute: Loop Free Alternates Revisited," Department of Telecommunications and Media Informatics, Budapest University of Technology and Economics, Proceedings of IEEE INFOCOM, Apr. 10-15, 2011, 9 pp.

Retana et al., "OSPF Stub Router Advertisement," RFC 3137, Network Working Group, Jun. 2001, 5 pp.

Bryant et al., "Remote LFA FRR, draft-shand-remote-lfa-00," Internet-Draft, Network Working Group, Oct. 11, 2011, 12 pp.

Kahn, "Topological Sorting of Large Networks," Westinghouse Electric Corporation, Communications of the ACM, vol. 5, Issue 11, pp. 558-562, Nov. 1962.

Moy, "OSPF Version 2," RFC 2328, Network Working Group, Apr. 1998, 204 pp.

Atlas et al., "An Architecture for IP/LDP Fast-Reroute Using Maximally Redundant Trees," PowerPoint presentation, IETF 81, Quebec City, Canada, Jul. 27, 2011, 28 pp.

Callon, "Use of OSI IS-IS for Routing in TCP/IP and Dual Environments," RFC 1195, Network Working Group, Dec. 1990, 80 pp.

Shand et al., "A Framework for Loop-Free Convergence," RFC 5715, Internet Engineering Task Force (IETF), Jan. 2010, 23 pp.

Vasseur et al., "Intermediate System to Intermediate System (IS-IS) Extensions for Advertising Router Information," RFC 4971, Network Working Group, Jul. 2007, 10 pp.

(56) References Cited

OTHER PUBLICATIONS

Atlas et al., "Algorithms for computing Maximally Redundant Trees for IP/LDP Fast-Reroute, draft-enyedi-rtgwg-mrt-frr-algorithm-00," Internet-Draft, Routing Area Working Group, Oct. 24, 2011, 36 pp.

Atlas et al., "An Architecture for IP/LDP Fast-Reroute Using Maximally Redundant Trees, draft-atlas-rtgwg-mrt-frr-architecture-00," Internet-Draft, Routing Area Working Group, Jul. 4, 2011, 22 pp.

Karan et al. "Multicast Only Fast Re-Route, Internet-Draft, draft-karan-mofrr-01," Internet-Draft, Network Working Group, Mar. 13, 2011, 15 pp.

Aggarwal et al, "Extensions to Resource Reservation Protocol—Traffic Engineering (RSVP-TE) for Point-to-Multipoint TE Label Switched Paths (LSPs)," RFC 4875, Network Working Group, May 2007, 53 pp.

Awduche et al., "RSVP-TE: Extensions to RSVP for LSP Tunnels," RFC 3209, Network Working Group, Dec. 2011, 61 pp.

Andersson et al., "LDP Specification," RFC 3036, Network Working Group, Jan. 2001, 124 pp.

Giacalone et al., "OSPF Traffic Engineering (TE) Express Path, draft-giacalone-ospf-te-express-path-02.txt," Internet-Draft, Network Working Group, Sep. 21, 2011, 15 pp.

Atlas et al., "Interface to the Routing System Framework, draft-ward-irs-framework-00," Internet-Draft, Network Working Group, Jul. 30, 2012, 21 pp.

Atlas et al., "An Architecture for the Interface to the Routing System, draft-atlas-i2rs-architecture-02," Internet-Draft, Network Working Group, Aug. 13, 2013, 21 pp.

Atlas et al., "An Architecture for IP/LDP Fast-Reroute Using Maximally Redundant Trees, draft-ietf-rtgwg-mrt-frr-architecture-03," Internet-Draft, Routing Area Working Group, Jul. 12, 2013, 29 pp.

Bahadur et al., "Routing Information Base Info Model, draft-nitinb-i2rs-rib-info-model-01," Internet-Draft, Network Working Group, Jul. 15, 2013, 24 pp.

Previdi et al., "Segment Routing with IS-IS Routing Protocol, draft-previdi-filsfils-isis-segment-routing-02," Internet-Draft, IS-IS for IP Internets, Mar. 20, 2013, 27 pp.

Karan et al., "Multicast only Fast Re-Route, draft-ieff-rtgwg-mofrr-08," Internet-Draft, Network Working Group, May 18, 2015, 14 pp.

Enyedi et al., "Algorithms for computing Maximally Redundant Trees for IP/LDP Fast-Reroute, draft-enyedi-rtgwg-mrt-frr-algorithm-03," Internet-Draft, Routing Area Working Group, Jul. 15, 2013, 51 pp.

Prosecution History from U.S. Appl. No. 13/418,152, dated Dec. 19, 2013 through Jul. 10, 2014, 26 pp.

Prosecution History from U.S. Appl. No. 13/418,180, dated Feb. 14, 2014 through Apr. 14, 2015, 102 pp.

Prosecution History from U.S. Appl. No. 13/418,212, dated Dec. 20, 2013 through Dec. 19, 2014, 43 pp.

Prosecution History from U.S. Appl. No. 13/418,212, dated May 15, 2015 through Nov. 24, 2016, 155 pp.

Atlas et al., "An Architecture for Multicast Protection Using Maximally Redundant Trees, draft-atlast-rtgwg-mrt-mc-arch-02," Internet-Draft, Routing Area Working Group, Jul. 12, 2013, 30 pp.

European Search Report from counterpart European Application No. 18180678.7, dated Dec. 5, 2018, 12 pp.

Enyedi et al., "Algorithms for computing Maximally Redundant Trees for IP/LDP Fast-Reroute, draft-ietf-rtgwg-mrt-frr-algorithm-07," Dec. 21, 2015, 125 pp.

Atlas et al., "LDP Extensions to Support Maximally Redundant Trees, draft-ietf-mpls-ldp-mrt-05," Feb. 17, 2017, 18 pp.

Response to European Search Report from counterpart EP Application No. 18180687.7, dated Dec. 5, 2018, filed Jul. 22, 2019, 17 pp.

\* cited by examiner

MAXIMALLY REDUNDANT TREES TO REDUNDANT MULTICAST SOURCE NODES FOR MULTICAST PROTECTION

TECHNICAL FIELD

The disclosure relates to computer networks and, more particularly, to forwarding network traffic within computer networks.

BACKGROUND

A routing protocol defines a process by which network devices, referred to as routers in packet-switched networks, communicate with each other to disseminate information that allows the routers to select routes between any two nodes on a computer network. One type of routing protocol, referred to as a link state protocol, allows routers to exchange and accumulate link state information, i.e., information describing the various links within the network. With a typical link state routing protocol, the routers exchange information related to available interfaces, metrics and other variables associated with network links. This allows a router to construct its own topology or map of the network. Some examples of link state protocols include the Open Shortest Path First (OSPF) protocol and the Intermediate-System to Intermediate System (IS-IS) protocol, which are Interior Gateway Protocols (IGP).

The connection between two devices on a network is generally referred to as a link. Connections between devices of different autonomous systems are referred to as external links while connections between devices within the same autonomous system are referred to as internal links. Many conventional computer networks, including the Internet, are designed to dynamically reroute data packets in the event an individual link fails. Upon failure of a link, the routers transmit new connectivity information to neighboring devices, allowing each device to update its local routing table. Links can fail for any number of reasons, such as failure of the physical infrastructure between the devices, or failure of the devices interfacing with the link.

When a link or router in the network fails, routers using traditional link state protocols such as OSPF and IS-IS may take a long time to adapt their forwarding tables in response to the topological change resulting from node and link failures in the network. The process of adapting the forwarding tables is known as convergence. This time delay occurs because recovery from a failure requires each node to re-compute the shortest path algorithm to calculate the next-hop for the affected nodes in the network. Until the next-hops are re-computed, traffic being sent toward the failed links may be dropped. Some deployments take time in the order of 500 milliseconds to several seconds for detection and recovery from failures in the network. These large convergence times may adversely affect the performance of Voice over Internet Protocol (VoIP) and multimedia applications, which are extremely sensitive to traffic loss. Service providers are demanding end-to-end failure detection and recovery times to be less than 50 milliseconds.

Using multicasting, a network distributes multicast packets to a set of interested receivers that can be on different subnetworks and that are configured as members of a multicast group. Protocol Independent Multicast (PIM) is one example of a protocol for creating multicast distribution trees in the network for distributing packets. Redundant multicast sources for multicast content can be configured with a common anycast IP address and each output a separate identical multicast stream. Due to the redundancy, in the event of network failure or failure of one of the redundant multicast sources, unicast routing converges around the failure and the network builds a new multicast distribution tree to distribute the multicast packets, e.g., from a still-active multicast source.

Multipoint extensions of protocols exist for establishing multipoint label-switched paths (LSPs), e.g., multipoint extensions of LDP (mLDP). In mLDP, a multipoint LSP may be established according to an egress-initiated signaling model in which each of the egress nodes initiate label information for the multipoint LSP that is propagated upstream through one or more intermediate transit routers along a path toward the root node. The label information for the multipoint LSP includes a label of the sending node allocated for the multipoint LSP and a forwarding equivalence class (FEC) that uniquely identifies the multipoint LSP based on the root node address and an opaque value. The multipoint LSP is then used by the network to deliver multicast traffic to a set of interested receivers.

SUMMARY

In general, techniques are described for enabling a network of network devices (or "nodes") to provide redundant multicast streams from redundant multicast sources to an egress network node. In some examples, the egress network node (or a controller for the network) computes maximally redundant trees (MRTs) from the egress network node to a virtual proxy node virtually added to the network topology by the egress network node for redundant multicast sources of redundant multicast streams. The MRTs are a pair of trees, computed based on the topology of the network and rooted at the virtual proxy node, where the path from the egress network node to the virtual proxy node along the first MRT of the pair and the path from the egress network node to the same virtual proxy node along the second MRT of the pair share a minimum number of nodes and a minimum number of links in the topology. In other words, the paths of the first MRT and the second MRT are as disjoint as possible in the topology of the network. The egress network node outputs separate first and second join messages requesting to receive the multicast stream via each of the first MRT and the second MRT.

Because the path of a join message results in a network delivering the requested multicast stream along the reverse path of the path traversed by the join message, the network may therefore deliver a first one of the redundant multicast streams along a reverse path of the path of the first MRT (traversed by a first join message) to the egress network node and a second one of the redundant multicast streams along a reverse path of path of the second MRT (traversed by second join message) to the egress network node. The egress network node may forward at least one of the multicast streams to an interested receiver.

The techniques of this disclosure may provide one or more advantages. For example, the techniques may provide maximally redundant (and in some cases, disjoint) paths to the proxy node and, correspondingly, maximally redundant (and in some cases, disjoint) paths to the redundant multicast sources. Because the network delivers redundant multicast streams from redundant multicast sources to the egress network node along reverse paths for the pair of MRTs, the redundant multicast streams traverse maximally redundant (and in some cases, disjoint) paths through the network to the egress network node. Upon failure of any of multicast source, network node, or link that constitutes either of the paths traversed by the multicast streams, the egress network node may quickly switch to deliver the other, still available, multicast stream to the interested receiver. The techniques may additionally avoid issues that may arise in other approaches to multicast protection, such as multicast only fast-reroute (MoFRR), in cases where the redundant multicast sources have a common anycast IP address, and the egress network node is unable to determine which routes are to the same node advertising the anycast IP address and which routes are to different nodes, as may be the case with equal-cost multipath (ECMP) routes.

In one example, a method comprises by an egress network node of a network of network nodes connected according to a network topology, computing, using routing information for the network, a pair of maximally redundant trees (MRTs) from the egress network node to a virtual proxy node, with the virtual proxy node as a root of the MRTs and having respective links, in a network graph of the network topology modified to include the virtual proxy node, virtually coupling the virtual proxy node with a first network node of the network and a second network node of the network, wherein the first network node and the second network node of the network distribute, using respective redundant multicast streams, multicast content received by the first network node from a first source device and by the second network node from a second source device, wherein the first source device and second source device are redundant multicast sources for the multicast content; outputting, by the egress network node via a path along a first MRT of the pair of MRTs, a first message requesting to receive one of the redundant multicast streams; and outputting, by the egress network node via a path along the second MRT of the pair of MRTs, a second message requesting to receive one of the redundant multicast streams.

In one example, a network device configured to operate as an egress network node of a network of network nodes connected according to a network topology, the network device comprising one or more programmable processors operably coupled to a memory and configured to: compute, using routing information for the network, a pair of maximally redundant trees (MRTs) from the network device to a virtual proxy node, with the virtual proxy node as a root of the MRTs and having respective links, in a network graph of the network topology modified to include the virtual proxy node, virtually coupling the virtual proxy node with a first network node of the network and a second network node of the network, wherein the first network node and the second network node of the network distribute, using respective redundant multicast streams, multicast content received by the first network node from a first source device and by the second network node from a second source device, wherein the first source device and second source device are redundant multicast sources for the multicast content; output, via a path along a first MRT of the pair of MRTs, a first message requesting to receive one of the redundant multicast streams; and output, via a path along the second MRT of the pair of MRTs, a second message requesting to receive one of the redundant multicast streams.

In one example, a non-transitory computer-readable storage medium comprising instructions that, when executed, cause one or more programmable processors, of a network device of a network of network nodes connected according to a network topology, to: compute, using routing information for the network, a pair of maximally redundant trees (MRTs) from the network device to a virtual proxy node, with the virtual proxy node as a root of the MRTs and having respective links, in a network graph of the network topology modified to include the virtual proxy node, virtually coupling the virtual proxy node with a first network node of the network and a second network node of the network, wherein the first network node and the second network node of the network distribute, using respective redundant multicast streams, multicast content received by the first network node from a first source device and by the second network node from a second source device, wherein the first source device and second source device are redundant multicast sources for the multicast content; output, by the network device via a path along a first MRT of the pair of MRTs, a first message requesting to receive one of the redundant multicast streams, and output, by the network device via a path along the second MRT of the pair of MRTs, a second message requesting to receive one of the redundant multicast streams.

The details of one or more examples are set forth in the accompanying drawings and the description below. Other features, objects, and advantages will be apparent from the description and drawings, and from the claims.

BRIEF DESCRIPTION OF DRAWINGS

Like reference characters refer to like elements throughout the figures and text.

DETAILED DESCRIPTION

Figure 1A:
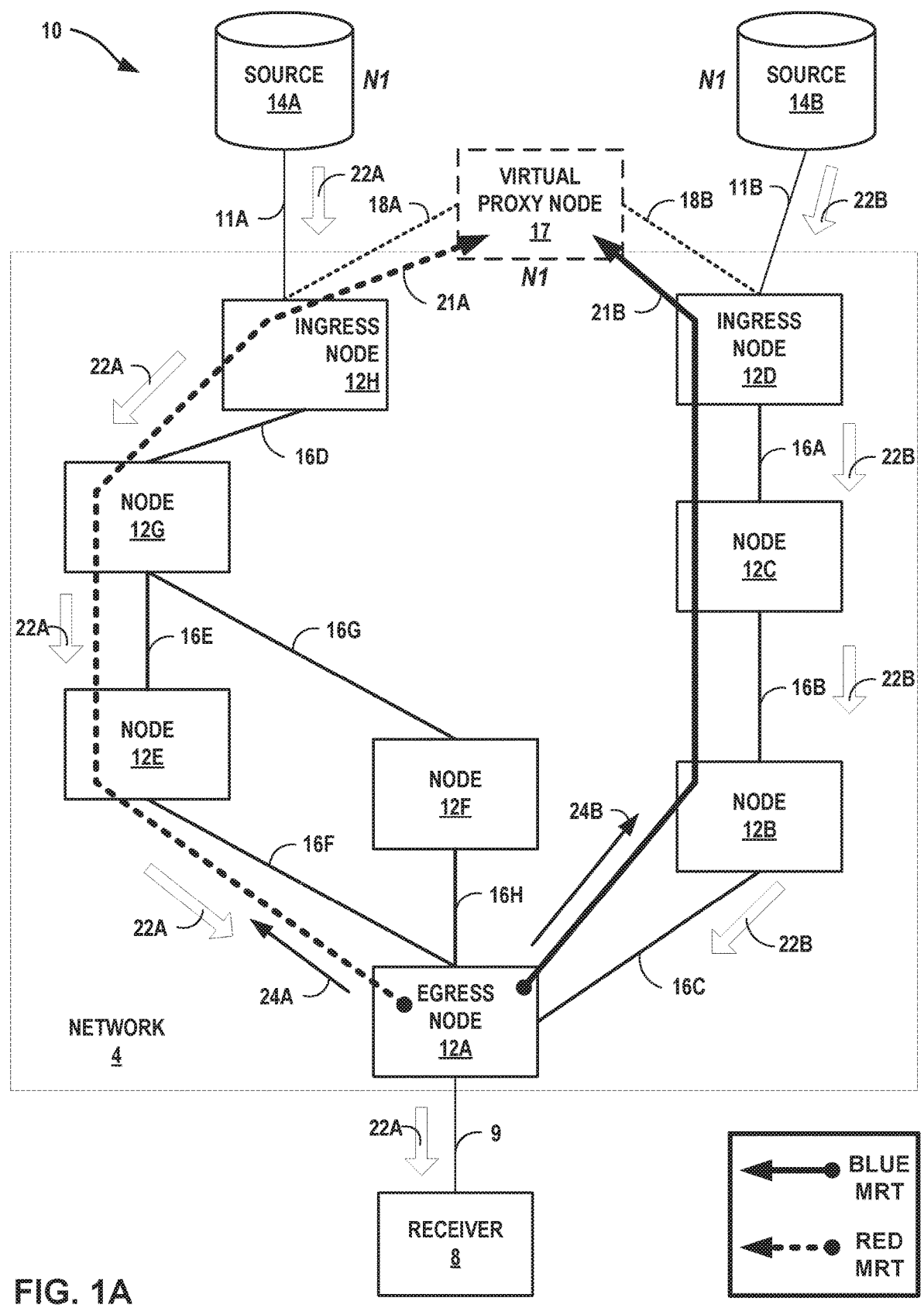
FIGS. 1A-1B are block diagrams illustrating a system that includes an example network having network devices, according to techniques of this disclosure.
Figure 1B:
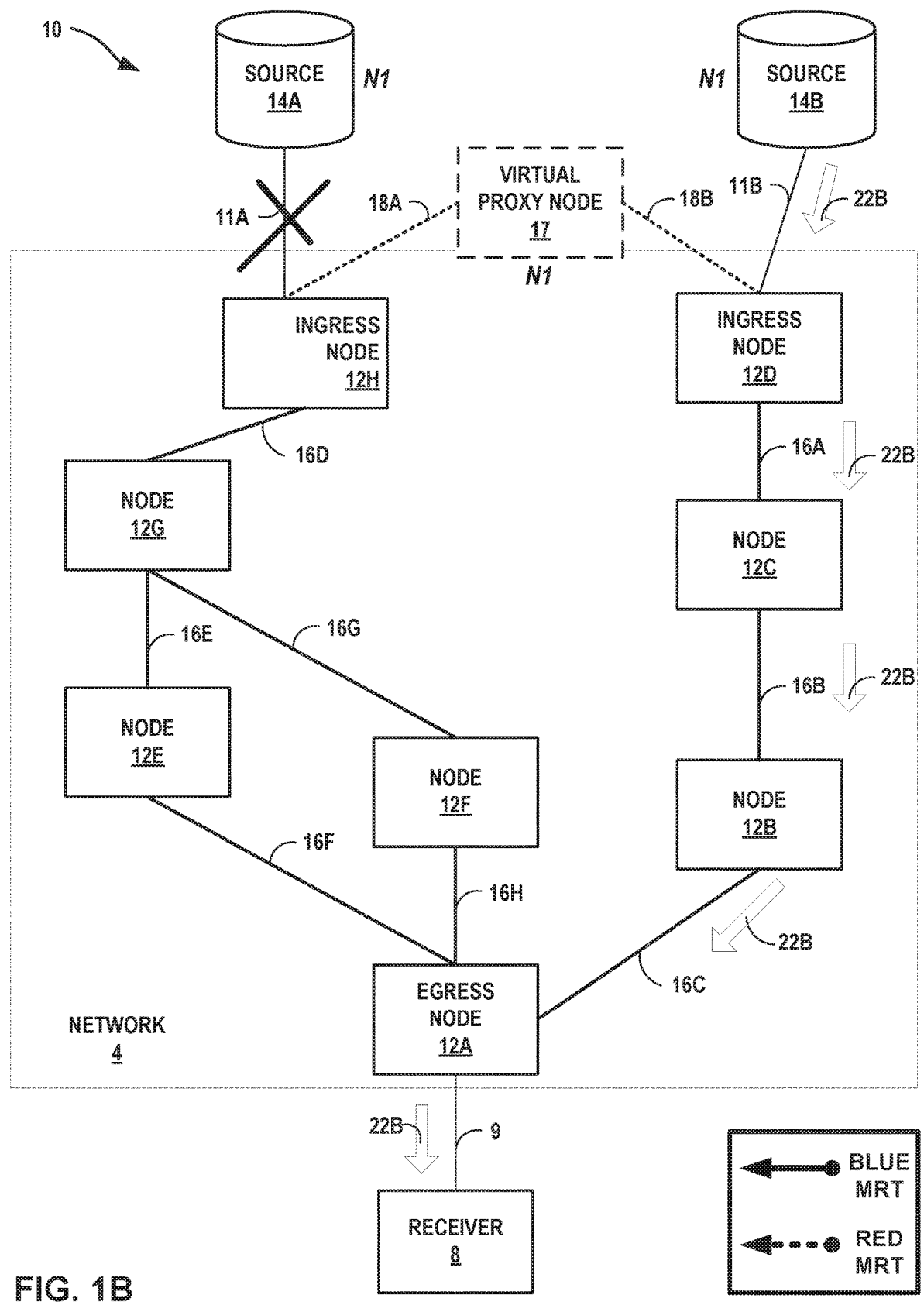

FIGS. 1A-1B are block diagrams illustrating a system 10 that includes an example network 4 having network devices 12A-12H (illustrated and alternatively described herein as "nodes 12"), according to techniques of this disclosure. Each of nodes 12 may be a router or may be another network device that includes routing capabilities. Nodes 12 use a link-state routing protocol, such as the Open Shortest Path First (OSPF) protocol, the Intermediate-System to Intermediate System (IS-IS) protocol, Routing Information Protocol (RIP), and Enhanced Interior Gateway Routing Protocol (EIGRP), to exchange routing information via routing protocol messages to learn the topology of network 14. The routing protocol may be referred an interior gateway protocol (IGP). Ingress node 12H outputs routing advertisements that conform to the routing protocol and indicate reachability of IP address N1 of multicast source 14A from ingress node 12H. Ingress node 12D outputs routing advertisements that conform to the routing protocol and indicate reachability of IP address N1 of multicast source 14B from ingress node 12D. While the term "IP address" is used as an example, other forms of layer 3 (network layer) addresses may be used for the described techniques.

Nodes 12 are connected to one another in a network topology by links 16A-16H ("links 16"). Although shown for simplicity and purposes of example as including nodes 12A-12H arranged in the particular network topology illustrated in FIGS. 1A-1B, network 4 may in various examples include various numbers of network devices arranged in various topologies (not shown). Further details regarding OSPF are found in Moy, J., "OSPF Version 2," RFC 2328, April 1998, the entire contents of which are incorporated by reference herein. Further details regarding IS-IS are found in Callon, R., "Use of OSI IS-IS for Routing in TCP/IP and Dual Environments," RFC 1195, December 1990, the entire contents of which are incorporated by reference herein.

Network 4 distributes multicast streams received from any of multicast sources 14A, 14B to interested receivers connected to the network 4, such as receiver 8. Each of multicast sources 14 represents a computing device, such as a real and/or virtual server, that outputs a multicast stream for a multicast group that is a set of interested receivers of the multicast stream. Each of multicast sources 14 may be located in a remote network connected to network 4. Multicast source 14A connects via link 11A to ingress node 12H that "ingresses" the multicast stream 22A to network 4 for delivery to one or more egress nodes, such as egress node 12A, that may "egress" the multicast stream 22A to interested receivers connected to the egress nodes. Multicast source 14B connects via link 11B to ingress node 12D that ingresses the multicast stream 22B to network 4 for delivery to one or more egress nodes, such as egress node 12A, that may egress the multicast stream 22B to interested receivers connected to the egress nodes. In some examples, links 11A, 11B represent networks and may include one or more routers or other network devices for connecting sources 14 to respective ingress nodes 12H, 12D. Each of nodes 12 may execute one or more of Protocol-Independent Multicast (PIM), multipoint label distribution protocol (mLDP, alternatively referred to as "multicast LDP"), Resource Reservation Protocol with Traffic Engineering extensions (RSVP-TE), or other protocol for establishing multicast distribution trees in a network.

Multicast sources 14 are redundant multicast sources in that each of multicast sources 14A, 14B sources a corresponding one of redundant multicast streams 22A, 22B for a multicast group (e.g., for PIM-Sparse Mode (PIM-SM) or PIM-any-source multicast (PIM-ASM)) or multicast channel (e.g., for PIM Source-Specific Multicast (PIM-SSM)) where the multicast channel is identified by both the multicast group and a specific multicast source. The same content is provided by each of redundant multicast streams 22A, 22B. Multicast streams 22 each represents a set of multicast packets (or "multicast traffic") that transports content from a multicast source 14 to the interested receivers. Multicast content may include, e.g., Internet Protocol Television (IPTV), desktop conferences, corporate broadcasts, music and video web casts, and other forms of multimedia content. Packets of a multicast stream may each have a source IP address that is an IP address of the multicast source that output the multicast stream. For example, packets of multicast stream 22A may have a source IP address of N1.

Anycasting is a packet routing technique in which a single IP address, referred to as the anycast IP address (or more, simply, the "anycast address"), is advertised from multiple locations in a network. Based on routing information, nodes of the network forward packets addressed to the anycast address to the logically nearest one of the multiple locations advertising the anycast address. In the example of FIGS. 1A-1B, redundant multicast sources 14 are configured with a common anycast IP address, N1, for sourcing redundant multicast streams 22. N1 may be an IPv4 or IPv6 anycast address. Because ingress nodes 12H, 12D are both ingress nodes for N1, both ingress nodes 12H, 12D may separately advertise routes to NJ. A request to join a source-specific multicast channel using PIM-SSM may specify NJ as the source for the multicast channel.

Receiver 8 is an interested receiver device for the multicast streams 22. Receiver 8 may include a personal computer, laptop, workstation, personal digital assistant (PDA), smartphone, network-ready appliance, television, or other computing device capable of accessing network 4 and receiving a multicast stream. Receiver 8 may issue an Internet Group Management Protocol (IGMP) message or other protocol message requesting to join a multicast group or multicast channel for which multicast sources 14 source multicast streams 22. Egress nodes for network 4 for multicast streams 22, such as egress node 12A, may receive IGMP messages from interested receivers and responsively output messages (such as a PIM Join message or LDP label mapping message) requesting to receive multicast streams 22 for delivery by the egress nodes to the interested receivers.

Each of nodes 12 may calculate next-hops to be used to reach other nodes 12 in network 14 based on the link-state routing information, and may install the calculated next-hops in stored forwarding information for forwarding network traffic destined for the other nodes. These next-hops may be referred to as "primary next-hops." In normal IGP routing, each router has its shortest-path-tree to all destinations. From the perspective of a particular destination, D, this looks like a reverse SPT (rSPT).

A network graph is a graph that reflects the network topology where all links connect exactly two nodes and broadcast links have been transformed into the standard pseudo-node representation. The term "2-connected," as used herein, refers to a graph that has no cut-vertices, i.e., a graph that requires two nodes to be removed before the network is partitioned. A "cut-vertex" is a vertex whose removal partitions the network. A "cut-link" is a link whose removal partitions the network. A cut-link by definition must be connected between two cut-vertices. If there are multiple parallel links, then they are referred to as cut-links in this document if removing the set of parallel links would partition the network.

Redundant Trees (RT) are a pair of trees where the path from any node X to the root R along the first tree is node-disjoint with the path from the same node X to the root along the second tree. These can be computed in 2-connected graphs. Maximally Redundant Trees (MRT) are a pair of trees where the path from any node X to the root R along the first tree and the path from the same node X to the root along the second tree share the minimum number of nodes and the minimum number of links. Each such shared node is a cut-vertex. Any shared links are cut-links. Any RT is an MRT but many MRTs are not RTs. MRTs are practical to maintain redundancy even after a single link or node failure. If a pair of MRTs is computed rooted at each destination, all the destinations remain reachable along one of the MRTs in the case of a single link or node failure so long as the failed link/node is not shared by the pair of MRTs. The MRTs in a pair of MRTs are sometimes distinguished as the "Red MRT" and the "Blue MRT."

For each pair of destination-rooted MRTs, there is a path from every node X to the destination D on the Blue MRT that is as disjoint as possible from the path on the Red MRT. The two paths along the two MRTs to a given destination-root of a 2-connected graph are node-disjoint, while in any non-2-connected graph, only the cut-vertices and cut-edges can be contained by both of the paths.

Egress nodes for network 4 for multicast streams 22, such as egress node 12A, may receive IGMP messages from interested receivers and responsively output messages (such as a PIM Join message) requesting to receive multicast streams 22 for delivery by the egress nodes to the interested receivers.

For example, and as noted above, egress node 12A may receive an IGMP message (e.g., an IGMP Report) or other message from receiver 8 requesting to receive a multicast stream 22. In accordance with techniques described in this disclosure, egress node 12A computes maximally redundant trees (MRTs) 21A, 21B from egress node 12A to a virtual proxy node 17 that represents redundant multicast sources 14 of redundant multicast streams 22. Based on routing information obtained by egress node 12A using one or more routing protocols or on configuration information supplied by an operator of the egress node 12A, the routing information or configuration information indicating the network topology for network 4, egress node 12A adds to the network topology a virtual proxy node 17 that is reachable from each of ingress nodes 12H, 12D to obtain a modified network topology. In the case of configuration information that indicates the network topology includes redundant multicast sources 14 of redundant multicast streams 22, the egress node 12A in response to receiving a request to receive a multicast stream 22 reads the configuration information to determine whether redundant multicast sources 14 of redundant multicast streams 22 exist and, if so, egress node 12A add the virtual proxy node 17 as described above.

The modified network topology is a representation of the network topology of network 4 as modified by egress node 12A to include the virtual proxy node 17 and virtual links 18A, 18B that virtually connect virtual proxy node 17 with ingress nodes 12H, 12D. The modified network topology may specify that the virtual link 18A connecting ingress node 12H to virtual proxy node 17 is link 11A connecting ingress node 12H to source 14A. The modified network topology may also specify that the virtual link 18B connecting ingress node 12D to virtual proxy node 17 is link 11B connecting ingress node 12D to source 14B. The modified network topology may also specify that virtual proxy node 17 has an IP address that is the shared anycast IP address, N1, for redundant multicast sources 14. Although virtual proxy node 17 is used to represent a next hop to N1 from each of ingress nodes 12H, 12D, virtual proxy node 17 is logically created by a control plane of egress node 12A for generating the modified network topology and has no counterpart real node or other network device in network 4.

Egress node 12A computes a pair of MRTs rooted at the virtual proxy node 17, from egress node 12A to virtual proxy node 17, using the modified network topology. The pair of MRTs computed are depicted in FIGS. 1A-1B as Red MRT 21A and Blue MRT 21B. Although MRT 21A is illustrated as traversing ingress node 12H to virtual proxy node 17 and MRT 21B is illustrated as traversing ingress node 12D to virtual proxy node 17, the IP address associated with virtual proxy node 17 in the modified network topology is the shared anycast IP address, NJ, for redundant multicast sources 14. Accordingly, forwarding state installed to ingress node 12H to forward packets to N in accordance with the modified network topology will cause ingress node 12H to deliver packets bearing N1 as a destination address to source 14A, because source 14A is the logically nearest device to ingress node 12H configured with the anycast IP address N1 according to the actual network topology for network 4. Likewise, forwarding state installed to ingress node 12D to forward packets to N1 in accordance with the modified network topology will cause ingress node 12D to deliver packets bearing NJ as a destination address to source 14B, because source 14B is the logically nearest device to ingress node 12D that is configured with the anycast IP address N1 according to the actual network topology for network 4.

Having computed the MRTs 21 and in response to receiving the IGMP message (e.g., an IGMP Report) or other message from receiver 8 requesting to receive a multicast stream 22, egress node 12A sends request 24A to receive a multicast stream 22 on the path for MRT 21A and sends request 24B to receive a multicast stream 22 on the path for MRT 21B. Each request 24A, 24B to receive a multicast stream 22 may be a PIM Join message to receive a multicast stream 22 transported by network 4 using IP multicast, an LDP label mapping message to receive a multicast stream 22 transported by network 4 using mLDP, or other message sent upstream toward multicast sources 14 to request to receive a multicast stream 22. Request 24A may have a destination IP address that is the anycast IP address N1. Request 24B may have a destination IP address that is the anycast IP address NJ. Egress node 12A may establish a label-switched path (LSP) or other forwarding tunnel or overlay along each of MRTs 21 using a signaling protocol, such as LDP or RSVP-TE, for transporting requests 24A, 24B. In some examples, each node 12 in the network 4 independently computes the pair of MRTs 21 from egress node 12A and rooted at virtual proxy node 17, according to techniques described herein with respect to egress node 12A. Each node 12 stores forwarding information for the pair of MRTs 21 and may provide LDP labels upstream to enable upstream nodes to identify traffic (e.g., requests 24) for delivery on one of the MRTs 21 rather than via the default shortest path. In some examples, the PIM join message or LDP label mapping message may indicate a forwarding topology to use for forwarding the join request or LDP label mapping message, e.g., the MRT 21A topology or the MRT 21B topology. Egress node 12A may install a pair of MRT next-hops for the pair of MRTs 21 to its forwarding information.

Egress node 12A, node 12E, node 12G, and ingress node 12H forward request 24A along the path of MRT 21A, such as according to forwarding state configured in the nodes for MRT 21A or based on request 24A indicating the MRT 21A topology. Ingress node 12H outputs the request 24A on an outbound interface mapped to the anycast IP address N1, which for ingress node 12H is an interface for link 11A.

Egress node 12A, node 12B, node 12C, and ingress node 12D forward request 24B along the path of MRT 21B, such as according to forwarding state configured in the nodes for MRT 21B or based on request 24A indicating the MRT 21A topology. Ingress node 12D outputs the request 24B on an outbound interface mapped to the anycast IP address N1, which for ingress node 12D is an interface for link 11B.

Each of nodes 12E, 12G, and 12H may process request 24A received via the path along MRT 21A and add forwarding state to cause the node to forward multicast stream 22A corresponding to the request 24A to the sending node. A multicast stream, flow, or traffic includes one or more packets.) For example, node 12E receives request 24A via link 16F with node 12A and responsively adds forwarding state (e.g., multicast distribute tree state for IP multicast or an LSP label for mLDP) to cause node 12F to forward multicast stream 22A to egress node 12A. Node 12G receives request 24A via link 16E with node 12E and responsively adds forwarding state to cause node 12G to forward multicast stream 22A toward node 12E. Ingress node 12H receives request 24A via link 16D with node 12G and responsively adds forwarding state to cause ingress node 12H to forward multicast stream 22A to node 12G. Nodes 12B, 12C, and 12D may process request 24B received via the path along MRT 21B in a manner similar to that described above with respect to processing request 24A.

As a result, network 4 delivers multicast stream sourced by multicast source 14A and ingressed to ingress node 12H via a path that is the reverse path of MRT 21A. Network 4 delivers multicast stream sourced by multicast source 14B and ingressed to ingress node 12D via a path that is the reverse path of MRT 21B. Because the reverse paths of the pair of MRTs 21 are also maximally redundant trees, multicast streams 22 traverse network 4 along paths that are maximally redundant. In some cases, the paths are disjoint, where the topology of the network allows. Egress node 12A is an egress node for the PIM multicast or the mLDP domain, which may include nodes of network 4. Egress node 12A forwards a primary one of multicast streams 22 (e.g., multicast stream 22A in FIGS. 1A-1B) to receiver 8 that is an interested receiver for the multicast group or multicast channel for the multicast streams 22. Egress node 12B drops the backup multicast stream 22 (e.g., multicast stream 22B in FIGS. 1A-1B). In some examples, egress node 12A determines which of multicast streams 22 to forward to receiver 8 based on a health of the multicast streams 22.

FIG. 1B illustrates a failure of a link or node or multicast source on the primary path corresponding to MRT 21, which prevents forwarding of multicast stream 22A along the reverse path for MRT 21A to egress node 12A. In the illustrated example, link 11A is depicted as failed. Egress node 12A detects a failure of multicast stream 22A caused by the failure on the primary path. For example, egress node 12A may detect the failure of the local interface as it is done for unicast Fast Reroute. Failure detection may be performed using the loss of signal or the loss of probing packets (e.g., bidirectional forwarding detection (BFD)). This option can be used in combination with the other options as documented below. Failure detection (and forwarding by egress node 12A) may be performed by comparing similar packets received for multicast streams 22A, 22B but only forwarding only the first packet received, regardless of which interface the packet is received on. Failure detection may be performed by assuming a minimum known packet rate for a given data stream. If a packet is not received on the primary reverse path forwarding (RPF) interface for the multicast stream 22A within the time frame defined by the minimum known packet rate, egress router 12A assumes primary path failure and switches to the secondary RPF interface. Failure detection of primary multicast stream 24A may be performed using other techniques not listed above.

In response to detecting the failure of multicast stream 22A, egress node 12A switches to multicast stream 22B. That is, egress node 12A begins forwarding multicast stream 22B to interested receiver 8, as illustrated in FIG. 1B.

The techniques of this disclosure may provide one or more advantages. For example, the techniques may provide maximally redundant (and in some cases, disjoint) paths 21 from egress node 12A to the virtual proxy node 17 and, correspondingly, maximally redundant (and in some cases, disjoint) paths from egress node 12A to the redundant multicast sources 14. Because the network 4 delivers redundant multicast streams 22 from redundant multicast sources 14 to the egress network node along reverse paths for the pair of MRTs, the redundant multicast streams 22 traverse maximally redundant (and in some cases, disjoint) paths through the network 4 to the egress node 12A. This provides multicast live-live functionality to egress node 12A such that, upon failure of any of multicast source 14A, a network node 12, or a link 16 that constitutes part of the primary path traversed by the multicast stream 22A, the egress node 12A may therefore quickly switch to deliver the other multicast stream to the interested receiver 8. Because the techniques may protect against head-end (multicast sources 14) failure, in combination with head-end redundancy, the techniques may improve multicast stream redundancy and reliability to interested receivers.

The techniques may additionally avoid issues that may arise in other approaches to multicast protection, such as multicast only fast-reroute (MoFRR), in cases such as that illustrated in FIGS. 1A-1B, i.e., where the redundant multicast sources 14 have a common anycast IP address. In this case the egress node 12A is unable to determine which routes to N1 via any of nodes 12E, 12F, 12B are to the same node advertising the anycast IP address and which routes are to different nodes, as may be the case with equal-cost multipath (ECMP) routes.

For example, MoFRR uses an ECMP mode for primary and secondary path selection. If the IGP installs two ECMP paths to the source, then the loop-free alternate is a primary next-hop. If the multicast tree is enabled for ECMP-Mode MoFRR, the router installs them as primary and secondary Upstream Multicast Hop (UMH), which are candidate next-hops that can be used to reach the root of the multicast tree. Before the failure, only packets received from the primary UMH path are processed while packets received from the secondary UMH are dropped in MoFRR. If more than two ECMP paths to the source exist, one is selected as primary and another as secondary UMH, and the selection of the primary and secondary is a local decision.

For the network topology of network 4, there exist three ECMP paths to N1: path A {12A→12E→12G→12H→N1}, path B {12A→12F→12G→12H→N1}, and path C {12A→12B→12C→12D→N1}. If egress node 12A were to apply MoFRR for multicast delivery and multicast stream protection, egress node 12A could select ECMP paths A and B that lead to multicast source 14A as the primary and secondary path, for egress node 12A is unable using MoFRR in ECMP mode to determine that paths A and B lead to multicast source 14A while only path C leads to multicast source 14B. Paths A and B are not maximally redundant and have single points of failure at source 14A, link 11A, ingress node 12H, link 16D, and node 12G. The techniques of this disclosure may address this deficiency to provide maximally redundant paths for requests 24A, 24B to traverse to multicast sources 14A, 14B, respectively. The techniques apply with respect to both ECMP and non-ECMP paths (i.e., the MRTs 21 may or may not be equal cost according to IGP metrics in other example topologies for network 4). As a result, the techniques may improve redundancy of the multicast streams 22 and may enhance the reliability of multicast delivery to interested receivers.

Figure 2A:
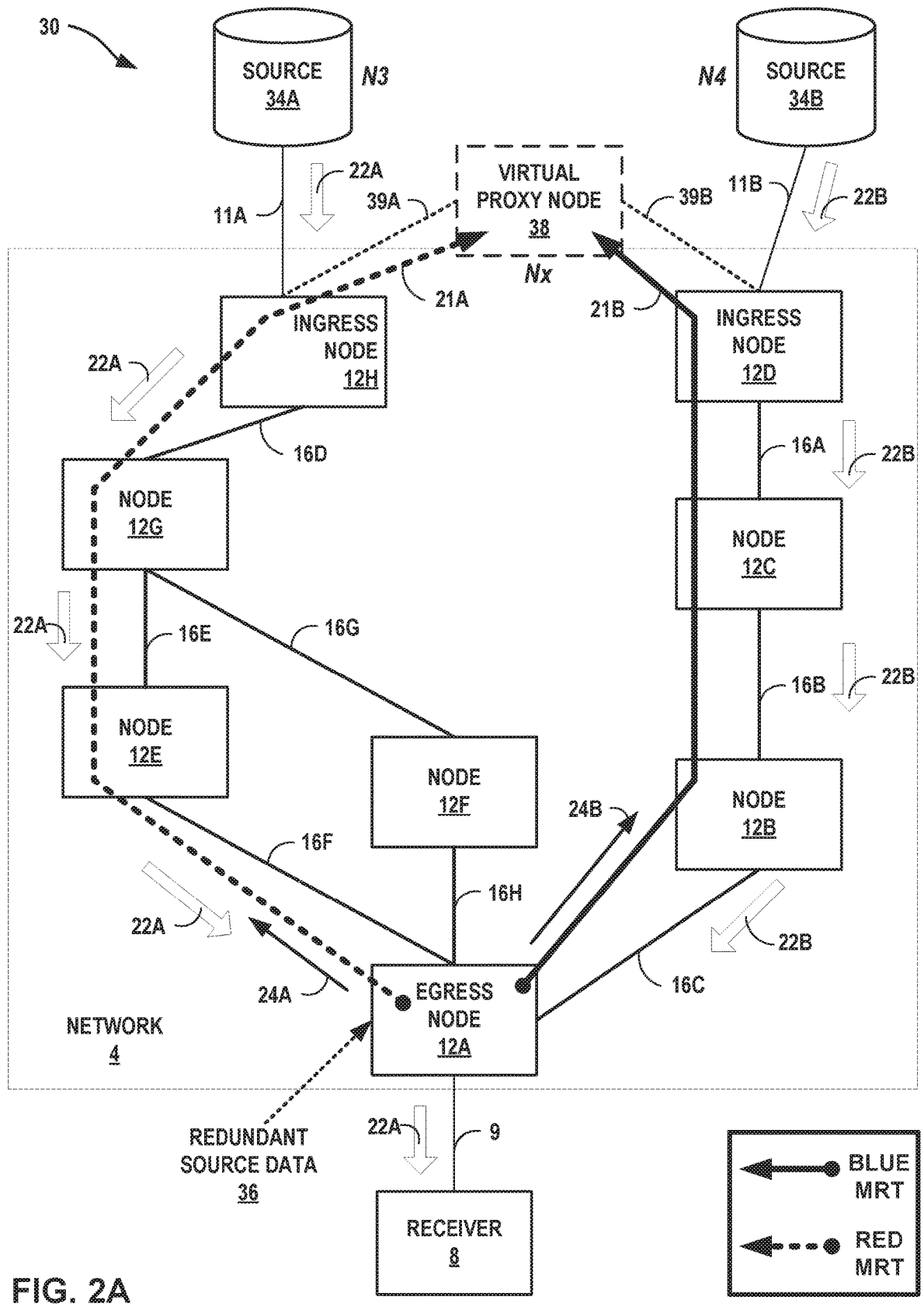
FIGS. 2A-2B are block diagrams illustrating a system that includes an example network having network devices, according to techniques of this disclosure.
Figure 2B:
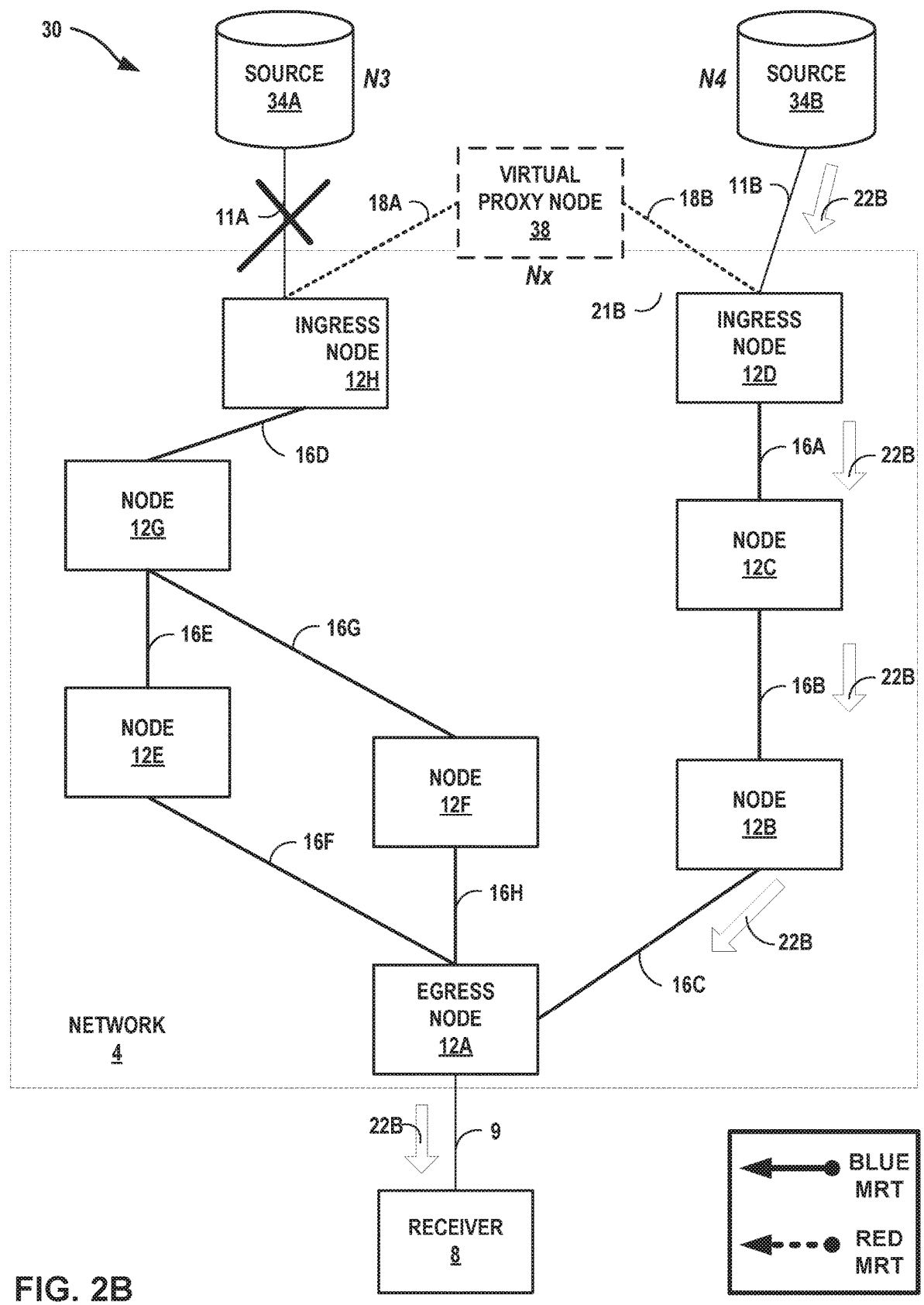

FIGS. 2A-2B are block diagrams illustrating a system that includes an example network, according to techniques of this disclosure. System 30 is similar to system 10 of FIGS. 1A-1B, but in system 10 multicast source 34A has IP address N3 and multicast source 34B has a different IP address N4. N3 and N4 may be non-anycast IP addresses. However, multicast sources 34 are otherwise similar to multicast sources 10 of FIGS. 1A-1B in that multicast sources 34 source redundant multicast streams 22A-22B for multicast content.

Egress node 12A obtains redundant source data 36 that indicates multicast sources 34A, 34B are redundant multicast sources for multicast streams 22 for multicast content. As examples, an operator for network 4 may configure egress node 12A with configuration information that includes redundant source data 36. Alternatively, egress node 12A may compare multicast streams 22A, 22B, determine the streams are redundant, and generate redundant source data 36 in response. Alternatively, receiver 8 may send redundant requests to receive redundant multicast streams 22A, 22B, which egress node 12A may interpret as indicating multicast streams 22A, 22B are redundant, and generate redundant source data 36 in response. Other enhancements to egress node 12A and system 30 are contemplated for enabling egress node 12A to consider multicast sources 34A, 34B as redundant multicast sources for multicast streams 22 for multicast content.

Based at least on redundant source data 36, egress node 12A determines multicast sources 34A, 34B as redundant multicast sources for multicast streams 22. In response to this determination and a request from receiver 8 to receive one of multicast streams 22, egress node 12A applies techniques described above with respect to FIGS. 1A-1B to compute a pair of maximally redundant trees 21A, 21B based on a modified network topology as modified to include virtual proxy node 38. Egress node 12A may then output respective requests 24A, 24B for forwarding on paths along the MRTs 21A, 21B using any of the techniques described above with respect to FIGS. 1A-1B for forwarding requests 24A, 24B on the paths.

To compute the pair of MRTs 21, egress node 12A determines from redundant source data 36 that multicast sources 34A, 34B may be represented as a single virtual proxy node 38 reachable from ingress nodes 12H, 12D. Using routing information for network 4, egress node 12A modifies the network topology for network 4 to include virtual proxy node with a placeholder IP address Nx. Nx may be any IP address that is not shared by other nodes of network 4. In some examples, egress node 12A may set Nx to one of N3 and N4.

Egress node 12A generates the modified network topology to include the virtual proxy node 38 and virtual links 39A, 39B that virtually connect virtual proxy node 38 with ingress nodes 12H, 12D. The modified network topology may specify that the virtual link 39A connecting ingress node 12H to virtual proxy node 38 is link 11A connecting ingress node 12H to source 34A, where the N3 endpoint for link 11B is replaced with Nx. The modified network topology may also specify that the virtual link 39B connecting ingress node 12D to virtual proxy node 38 is link 11B connecting ingress node 12D to source 34B, where the N4 endpoint for link 11B is replaced with Nx. Egress node 12A then computes the pair of MRTs 21 using the modified network topology. Although virtual proxy node 38 is used to represent a next hop from each of ingress nodes 12H, 12D, virtual proxy node 38 is logically created by a control plane of egress node 12A for generating the modified network topology and has no counterpart real node or other network device in network 4.

In the example of network 4, MRT 21A has path {12A→12E→12G→12H→Nx (virtual proxy node 38, via link 11A)}, and MRT 21B has path {12A→12B→12C→12D→Nx (virtual proxy node 38, via link 11B)}. Having computed MRTs 21A, 21B using the modified network topology, egress node 12A may in some cases modify the path computed for MRT 21A by replacing Nx with N3 and modify the path computed for MRT 21B by replacing Nx with N4. MRT 21A modified in this way has path {12A→12E→12G→12H→source 34A}, and MRT 21B modified in this way has path {12A→12B→12C→12D→source 34B}.

Egress node 12A outputs request 24A for forwarding along the path for MRT 21A, and egress node 12A outputs request 24B for forwarding along the path for MRT 21B. Egress node 12A subsequently receives redundant multicast streams 22A, 22B along the respective reverse paths for MRTs 21A, 21B, and forwards multicast stream 22A to interested receiver 8 while dropping multicast stream 22B.

Egress node 12A may further operate as described with respect to egress node 12A of FIGS. 1A-1B. For example, like FIG. 1B, FIG. 2B illustrates failure of the multicast stream 22A in system 30 due to failure of multicast source 34A or of a link or node along the reverse path for the MRT 21A. Egress node 12B detects the failure and switches to forwarding multicast stream 22B in multicast live-live fashion.

The above techniques may similarly apply for mLDP. In such cases, the egress node 12A computes a pair of MRTs to redundant mLDP root nodes (ingress nodes 12H, 12D) using virtual proxy node 38.

Figure 3:
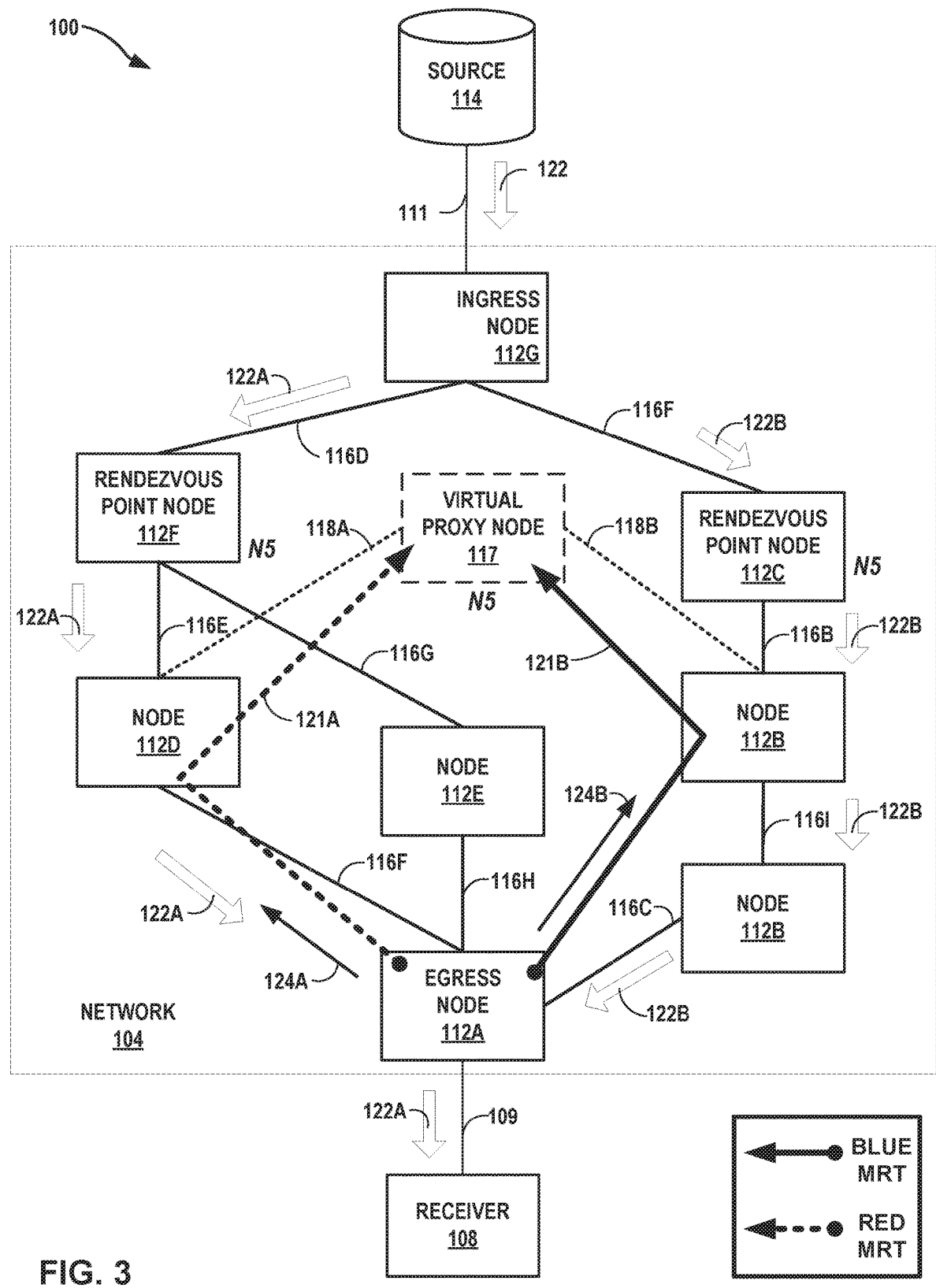
FIG. 3 is a block diagrams illustrating a system that includes an example network having network devices, according to techniques of this disclosure.

FIG. 3 is a block diagram illustrating a system 100 that includes an example network 104 having network devices 112A-112G ("nodes 112"), according to techniques of this disclosure. Source 114 is a multicast source that sources multicast stream 122 for delivery, at least in part, by network 104. Source 114 is similar at least in some respects to any of sources 14 and 34. Source 114 may have any anycast IP address or may not have any anycast IP address. Nodes 112 are similar to nodes 12, links 116 are similar to links 16, receiver 108 is similar to receiver 8, link 111 is similar to link 11, and link 109 is similar to link 9, of systems 10 and 30. Requests 124A, 124B may be similar to requests 24A, 24B, respectively, of systems 10 and 30.

In system 100, nodes 112F and 112C are configured as rendezvous point (RP) nodes for anycast RP. In general, a multicast (non-anycast) RP operates as a multicast source and all multicast traffic for a multicast stream converges on the RP, though convergence can be slow when the RP fails. In multicast specifically, there may be closer RPs on the shared tree, and thus the use of a single RP is suboptimal. Anycast RP, in contrast to multicast RP with a single RP, enables bypassing the restriction of having one active RP per multicast group by enabling multiple RPs for the same group or group range. Although a multicast RP is not an origin server for a multicast stream, a multicast RPs may be considered a multicast source.

With conventional anycast RP, the multiple RPs share a unicast IP address and share source information for one or more multicast sources. When an RP fails, sources and receivers are directed to a remaining active RP by way of unicast routing. That is, then the unicast route for the shared IP address converges to the next logically-closest RP, and the network builds a new multicast tree. The convergence time with conventional anycast RPs will therefore be the amount of time for unicast to converge plus the time needed to build the new multicast tree from the remaining active RP.

For the purposes of load balancing and redundancy, an operator or controller for network 104 may configure network 104 with anycast RPs (here, RP nodes 112F, 112C). The RP nodes 112F, 112C share one unicast IP address N5, which is consequently an anycast address and advertised using the IGP in network 104. Packets sent to the anycast address N5 are delivered by network 104 to the logically nearest RP nodes 112F, 112C as determined by the IGP. Anycast addressing can be used in PIM sparse mode to add load balancing and service reliability to RPs. In general, sources for one RP are known to other RPs that use the Multicast Source Discovery Protocol (MSDP). For instance, source 114 and receiver 108 use the closest RP, as determined by the IGP. RP nodes 112F, 112C receive an indication of multicast source 114 via PIM registration and, if the RP nodes 112F, 112C have a (*, G) entry, create (S,G) state for source 114 and join the shortest path tree to the source 114 to receive multicast stream 122 for the (S,G) multicast channel. Ingress node 112G replicates multicast stream 122 to RP nodes 112F, 112C as respective multicast streams 122A, 122B.

In response to receiving a request to receive a multicast stream "sourced" by any of RP nodes 112F, 112C, egress node 112A applies techniques described above with respect to FIGS. 1A-1B to compute a pair of maximally redundant trees 121A, 121B ("MRTs 121") based on a modified network topology modified to include virtual proxy node 117. Egress node 112A may generate the modified network topology based on configuration information stored by egress node 112A that indicates the RP nodes 112F, 112C are redundant sources for the multicast stream 122. Egress node 112A may then output respective requests 124A, 124B for forwarding on paths along the MRTs 121A, 121B using any of the techniques described above with respect to FIGS. 1A-1B for forwarding requests 124A, 124B on the paths.

To compute the pair of MRTs 121, egress node 112A represents the RP nodes 112F, 112C having shared IP address N5 as a single virtual proxy node 117 reachable from nodes 112D, 112B. Using routing information for network 104, egress node 112A modifies the network topology for network 104 to include the virtual proxy node 117 with IP address N5.

The modified network topology is thus a representation of the network topology of network 104 as modified by egress node 112A to include the virtual proxy node 117 and virtual links 118A, 118B that virtually connect virtual proxy node 117 with nodes 112D, 112B. The modified network topology may specify that the virtual link 118A connecting ingress node 112D to virtual proxy node 117 is link 116E connecting node 112D to RP node 112F. The modified network topology may also specify that the virtual link 118B connecting node 112B to virtual proxy node 117 is link 116B connecting node 112B to RP node 112C. The modified network topology may also specify that proxy node 117 has an IP address that is the shared anycast IP address, N5, for redundant RP nodes 112F, 112C. Although virtual proxy node 117 is used to represent a next hop to N5 from each of nodes 112D, 112B, virtual proxy node 117 is created by egress node 112A for generating the modified network topology and has no counterpart real node or other network device in network 104.

In the example of network 104, MRT 121A has path {112A→112D→N5 (virtual proxy node 117, via link 116E)}, and MRT 121B has path {112A→112B→N5 (virtual proxy node 117, via link 116B)}. Egress node 112A outputs request 124A for forwarding along the path for MRT 121A, and egress node 112A outputs request 124B for forwarding along the path for MRT 121B. Egress node 112A subsequently receives redundant multicast streams 122A, 122B along the respective reverse paths for MRTs 121A, 121B, and forwards multicast stream 122A to interested receiver 108 while dropping multicast stream 122B.

Egress node 112A may further operate as described with respect to egress node 112A of FIGS. 1A-1B. For example, like FIG. 1B, FIG. 2B illustrates failure of the multicast stream 122A in system 100 due to failure of RP node 112F or of a link or node along the reverse path for the MRT 121A. Egress node 112B detects the failure and switches to forwarding multicast stream 122B in multicast live-live fashion.

In some examples, each of RP nodes 112C, 12F may apply techniques described herein with respect to egress node 12A of FIGS. 1A-1B to compute a pair of maximally redundant trees from the RP node to the multicast source 114 and join the multicast shared tree for multicast stream 122 by outputting redundant requests to receive multicast stream 122 via the respective paths along the computed maximally redundant trees. In this way, each of the RP nodes 112C, 112F may receive redundant multicast streams 122 on maximally redundant (and in some cases disjoint) paths from source 114. Accordingly, such examples may provide full multicast live-live support on the multicast shared tree with anycast RP redundancy and maximally redundant paths.

The above techniques may similarly apply for mLDP. In such cases, the egress node 112A computes a pair of MRTs to RP nodes 112C, 112F that are redundant mLDP root nodes, using virtual proxy node 117.

Figure 4:
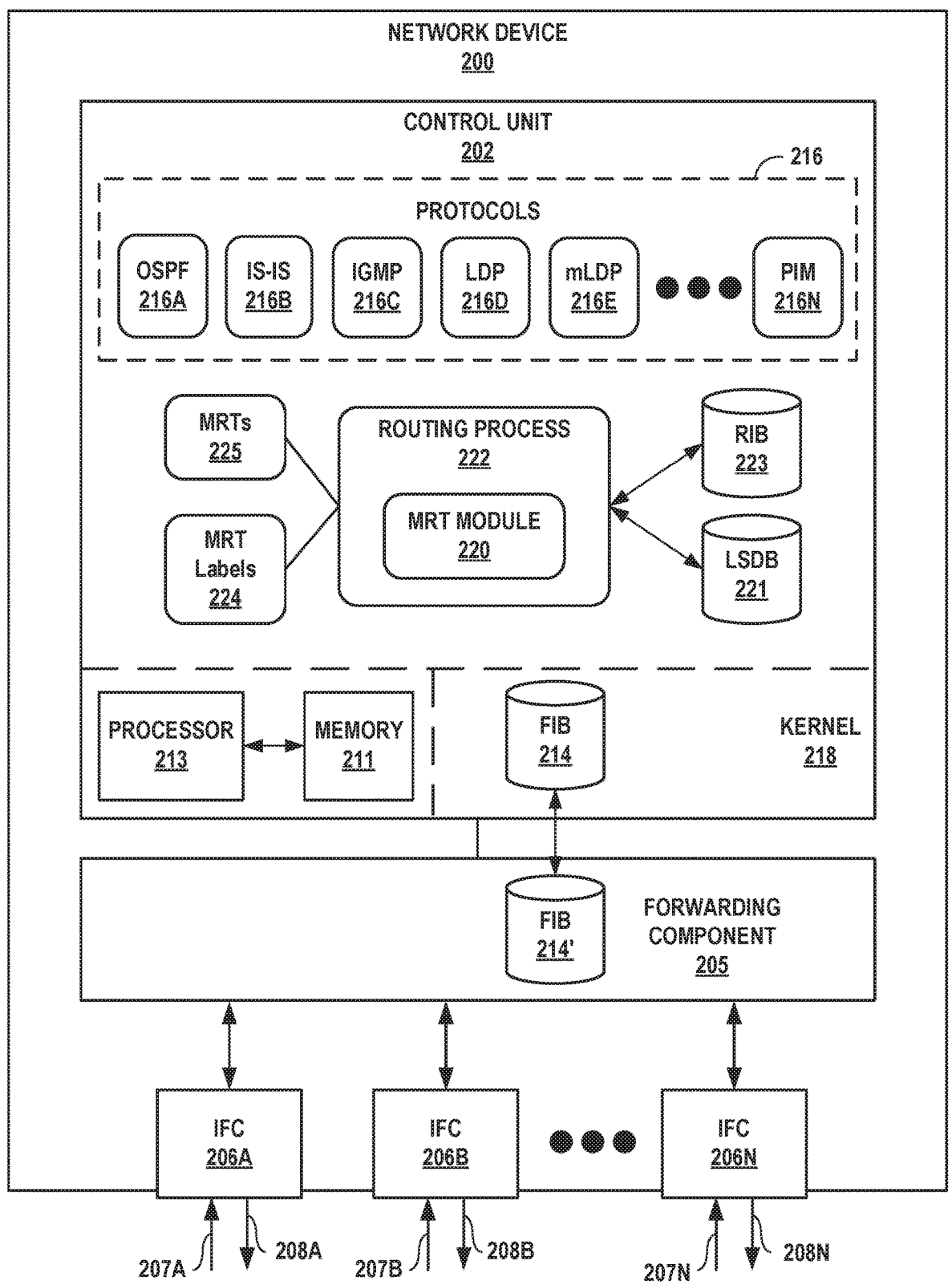
FIG. 4 is a block diagram illustrating an example network device, according to techniques described in this disclosure.

FIG. 4 is a block diagram illustrating an example network device, according to techniques described in this disclosure. In general, network device 200 may operate in a manner substantially similar to and may represent any of the network devices, routers, or nodes illustrated in the previous figures. For example, network device 200 may represent any of egress nodes 12A, 112A. Network device 200 includes a control unit 202 coupled to a forwarding component 205. Network device 200 includes interface cards 206A-206N ("IFCs 206") that receive packets via inbound links 207A-207N ("inbound links 207") and send packets via outbound links 208A-208N ("outbound links 208"). IFCs 206 includes interface ports (not shown) coupled to inbound links 207 and outbound links 208. While the example network device 200 has a bifurcated control plane and forwarding plane executed by separate hardware and/or software components, some example network devices that apply techniques described in this disclosure may have a hardware and/or software components that perform both control plane and forwarding plane operations.

Control unit 202 provides a hardware environment that includes one or more programmable processors 213 coupled to one or more memory devices 211. Control unit 202 may further include a storage device (not shown), such as a disk drive. The hardware environment of control unit 202 executes the control plane for network device 200, which includes an operating system, including kernel 218, that provides a multi-tasking operating environment for execution of concurrent processes. Routing process 222, for instance, represents one or more processes that execute protocols 216 for sending and receiving routing, path setup, management, and/or configuration information for a network that includes network device 200. Protocols 216 in the illustrated example include OSPF 216A, IS-IS 216B, Internet Group Management Protocol 216C, LDP 216D, mLDP 216E, and PIM 216N. Other protocols not shown in the illustrated example may include RSVP-TE, Border Gateway Protocol (BGP), and RIP, for instance. Network device 200 may not execute all of the illustrated protocols 216. For example, network device 200 may execute OSPF 216A but not IS-IS 216B, or vice-versa, or neither.

Routing process 222 executes protocols to obtain routing information for storage to routing information base (RIB) 223 and Link-State Database (LSDB) 221 to reflect the current topology of a network and other network entities to which it is connected. RIB 223 and LSDB 221 may describe a topology of the computer network in which network device 200 resides, and may also include routes through the shared trees in the computer network. RIB 223 and LSDB 221 describes various routes within the computer network, and the appropriate next-hops for each route, i.e., the neighboring routing devices along each of the routes. In some cases, RIB 223 and/or LSDB 221 may simultaneously include routes and associated next-hops for multiple topologies, such as the default (shortest-path) topology and the topologies for MRTs 225 computed by MRT module 220.

Routing process 222 and kernel 218 may process routing information included in RIB 223 and LSDB 221 to generate software forwarding information base (FIB) 214 that associates network destinations with specific next-hops and corresponding IFCs 206 and physical output ports for output links 208. Based on software FIB 214, kernel 218 programs forwarding component 205 to install the forwarding information as hardware FIB 214'.

Forwarding component 205 represents hardware and logic functions that provide high-speed forwarding of network traffic. Forwarding component 205 may include a set of one or more forwarding chips programmed with FIB 214' that maps network destinations and/or MPLS labels with specific next-hops and the corresponding output interface ports. In general, when network device 200 receives a packet via one of inbound links 207, forwarding component 205 identifies an associated next-hop for the data packet by traversing FIB 214 based on information within the packet. Forwarding component 205 forwards the packet on one of outbound links 208 mapped to the corresponding next-hop in accordance with FIB 214. Forwarding component 205 may be a distributed plurality of forwarding components distributed among one or more line cards interconnected by a switch fabric.

FIB 214 may be a radix tree programmed into dedicated forwarding chips, a series of tables, a complex database, a link list, a radix tree, a database, a flat file, or various other data structures. FIB 214 may include specific routes to forward multicast traffic for a given multicast group to neighboring routing devices. In general, when network device 200 receives a multicast packet via one of inbound links 207, forwarding component 205 determines a next-hop for the packet in accordance with FIB 214', and forwards the packet according to the next-hop.

Routing process 222 selects primary next-hops for a default routing topology. Routing process 222 may, for example, execute a Shortest Path First (SPF) calculation on the graph G representing a network topology for a graph that includes network device 200, with network device 200 as the source S to compute a primary next-hop to all destination nodes in the graph G. This SPF calculation is denoted SPF(S, G). Routing process 222 may obtain information that makes up graph G from RIB 223 and/or LSDB 221. Calculating SPF(S, G) allows routing process 222 to obtain the optimal distance from S to all nodes in the network topology represented by graph G. In some examples, routing process 222 may select the next-hop having the optimal (e.g., lowest cost) distance as the primary next-hop, and install the selected primary next-hop to FIB 214.

MRT module 220 of routing process 222 may apply a maximally redundant tree algorithm to compute a pair of MRTs (i.e., blue and red) per proxy node associated with one or more multicast source(s), according to technique described herein. For example, a destination for which MRT module 220 computes the pair of disjoint MRTs may be a destination associated with a routing device, a unicast destination prefix or IP address, an anycast IP address such as an address for any of multicast sources 14 or 34, and RP nodes 112F, 112C; or an address for a virtual proxy node used to modify a network topology for a network that includes network device 200.

Redundant trees are directed spanning trees that provide disjoint paths towards their common root. These redundant trees only exist and provide link protection if the network is 2-edge-connected and node protection if the network is 2-connected. Such connectiveness may not be the case in real networks, either due to architecture or due to a previous failure. Maximally redundant trees are useful in a real network because they may be computable regardless of network topology. The maximally redundant trees are computed so that only the cut-edges or cut-vertices are shared between the multiple trees. Computationally practical algorithms for computing MRTs may be based on a common network topology database, such as LSDB 221 and/or RIB 223. MRT algorithm variants can compute in $O(e)$ or $O(e+n \log n)$, where e is the number of edges in the network graph and n is the number of nodes in the network graph for the network topology.

The formulation of the Maximally Redundant Trees (MRT) algorithm may make it very well suited to use in routers. One aspect of MRT, and of redundant trees in general, is that the trees do not necessarily provide shortest detour paths. The use of the shortest-path-first algorithm in tree-building and including all links in the network as possibilities for one path or another may improve this. Providing shortest detour paths would require failure-specific detour paths to the destinations, but the state-reduction advantage of MRT lies in the detour being established per destination (root) instead of per destination and per failure.

A variety of algorithms may be used to calculate MRTs for any network topology, some of which are named or described below. These may result in trade-offs between computation speed and path length. An algorithm can compute complete MRTs or just next-hops. Router computation of its next-hops on each pair of MRTs for each node in the network can be completed in $O(e)$ time, where e is the number of edges in the network graph. Many algorithms are designed to work in real networks. For example, just as with SPF, an algorithm is based on a common network topology database, with no messaging required. Nodes in the network may be configured to apply consistent tie-breakers to ensure that identical destination-rooted MRTs are computed by all routers in an IGP area.

For network topologies with redundant multicast sources (such sources including anycast RP nodes), MRT module 220 may modify the network graph for the network topology to generated a modified network graph (hereinafter, the "modified network topology") that includes a virtual proxy node that represents the redundant multicast sources as a single destination reachable from nodes of the network having direct links with the redundant multicast sources. Examples of such network topologies and of generating such modified network topologies are described above with respect to FIGS. 1A-1B, 2A-2B, and 3. MRT module 220 computes the pair of MRTs 225 rooted at the virtual proxy node, with sources for the MRTs 225 potentially including egress nodes for multicast traffic for the network. Routing process 222 may process the MRTs 225 paths to generate respective forwarding next-hops for forwarding unicast packets to the multicast sources represented by the virtual proxy node, along either of the MRTs to the multicast sources represented by the virtual proxy node. Unicast packets destined to the multicast sources may transport requests 24 or 124 described herein, for instance. Routing process 222 installs the forwarding information to FIB 214 for configuration by kernel 218 to forwarding component 205 as FIB 214'.

MRT forwarding by network device 200 may differ according to whether IP or LDP unicast traffic is considered. Logically, one could use the same IP address or LDP forwarding equivalence class (FEC), and then also use two bits to express the topology to use. The topology options are (00) IGP/SPT, (01) blue MRT, (10) red MRT. This may have different consequences for IP and LDP, because LDP can add a topology label on top or take two spare bits from the LDP label space.

Once MRT module 220 computes the MRTs, the two sets of MRTs may be seen by the forwarding plane (execute in network device 200 by forwarding component 205 applying FIB 214') as essentially two additional topologies. Thus, the same considerations apply for forwarding along the MRTs as for handling multiple topologies. For LDP, it may be desirable to avoid tunneling because, for at least node protection, tunneling requires knowledge of remote LDP label mappings and thus requires targeted LDP sessions and the associated management complexity. Two different example mechanisms that can be used for handling the multiple MRT topologies, and marking packets being sent onto the MRT topologies, are described below.

A first option, referred to as Option A, is to encode MRT topology in labels. For example, in addition to sending a single label for a FEC, LDP 216D of network device 200 would provide two additional labels with their associated MRT colors. Each additional label specifies an MRT topology (blue or red) associated with one of the maximally redundant trees. The two additional labels may be stored in MRT labels 224. This approach may be simple, but can reduce the label space for other uses. This approach may also increase the memory needed to store the labels and the communication required by LDP 216D.

A second option, referred to as Option B, is to create topology-identification labels ("topology-id labels"). The topology-id labels may be stored in MRT labels 224, and may be LDP labels. In this approach, LDP 216D uses the label-stacking ability of multi-protocol label switching (MPLS) and specifies only two additional labels, one for each associated MRT color, by a new FEC type. When sending a packet onto an MRT, LDP 216D first swaps the LDP label and then pushes the topology-id label for that MRT color. When receiving a packet with a topology-id label, LDP 216D pops the topology-id label and uses the topology-id label to guide the next-hop selection in combination with the next label in the stack. For example, LDP 216D does a lookup within FIB 214 on the next inner label or the IP address of the packet (in the case of IP), and that lookup returns a set of sets of next-hops. LDP 216D then uses the topology-id label to select among the sets. For example, if the topology-id label indicates the blue MRT should be used, LDP 216D uses the next-hop (or stack of next-hops) for the blue MRT. Similarly, if the topology-id label indicates the red MRT should be used, LDP 216D uses the next-hop (or stack of next-hops) for the red MRT. If there is no topology-id label, then LDP 216D may just use the shortest path tree (SPT) next-hop (primary next-hop). LDP 216D then swaps the remaining label, if appropriate, and pushes the topology-id label if needed for use the next-hop, and outputs the labeled packet on the outbound interface associated with the next-hop.

The topology-id label approach has minimal usage of additional labels, memory, and LDP communication. The topology-id label approach does increase the size of packets and the complexity of the required label operations and look-ups. The topology-id label approach can, for example, use the same mechanisms as are needed for context-aware label spaces. For example, the top-level topology-id label may give context, and the next label may give next-hops. Further details on context-aware label spaces can be found within U.S. Pat. No. 9,246,801, entitled TRANSMITTING PACKET LABEL CONTEXTS WITHIN COMPUTER NETWORKS, issued Jan. 26, 2016, the entire content of which is incorporated by reference herein.

Note that with LDP unicast forwarding, regardless of whether topology-identification label or encoding topology in label is used, no additional loopbacks per router are required as are required in the IP unicast forwarding case. This is because LDP labels are used on a hop-by-hop basis to identify the blue MRT and red MRT forwarding trees.

LDP module 216D may be configured with extensions to LDP in various ways. For example, LDP module 216D may be configured to specify the topology in the label. That is, when sending a Label Mapping in a label mapping message that maps a FEC to a label, LDP module 216D may have the ability to include a topology identifier in the FEC TLV and send an associated Label TLV. The FEC TLV would include a multi-topology identifier (MT-ID) that is assigned to specify MRT and the associated MRT color. In the example of Topology-Identification Labels, LDP would be extended to define a new FEC type that describes the topology for MRT and the associated MRT color. Another example option may be for LDP 216D to advertise, per interface, a label indicating what the original incoming interface would have been.

For IP unicast traffic, tunneling may be used. The tunnel egress could be the original destination in the area, the next-next-hop, etc. If the tunnel egress is the original destination router, then the traffic remains on the redundant tree with sub-optimal routing. If the tunnel egress is the next-next-hop, then protection of multi-homed prefixes and node-failure for ABRs is not available. Selection of the tunnel egress is a router-local decision.

The following are a few options for marking IP packets with which MRT the receiving device should use for forwarding the received IP packets. First, a network device 200 may tunnel IP packets via an LDP LSP. This has the advantage that more installed routers can do line-rate encapsulation and decapsulation. Also, no additional IP addresses would need to be allocated or signaled. Option A within this approach is to use a LDP Destination-Topology Label. MRT module 220 may use a label that indicates both the destination and the MRT. This method allows easy tunneling to the next-next-hop as well as to the IGP-area destination. Option B within this approach is to use a LDP Topology Label. MRT module 220 may use a Topology-Identifier label on top of the IP packet. This is simple and doesn't require additional labels for proxy-nodes. If tunneling to a next-next-hop is desired, then a two-deep label stack can be used with [Topology-ID label, Next-Next-Hop Label].

Another approach is to tunnel IP packets in IP or other tunneling mechanism, such as Generic Route Encapsulation. Each router supporting this option may announce two additional loopback addresses and their associated MRT color. Those addresses are used as destination addresses for blue MRT or red MRT IP tunnels, respectively. The announced additional loopback addresses allow the transit nodes to identify the traffic as being forwarded along either the blue MRT or red MRT tree topology to reach the tunnel destination. The IGP, such as OSPF 216A or IS-IS 216B, may be extended to employ announcements of these two additional loopback addresses per router with the associated MRT color. Another option that might be used is a "pure" IP unicast option that uses a new IP (either IPv4 or IPv6) hop-by-hop option to specify the MRT color. A network device 200 that uses the IP option may process the IP option in the fast path, rather than feeding the packet to a line card to process.

For a virtual proxy node associated with multicast sources, each network device attached to the virtual proxy node in the modified network topology could announce two common IP addresses with their associated MRT colors. This may involve configuration as well as the previously mentioned IGP extensions. Similarly, in the LDP case, two additional FEC bindings could be announced.

In general, when network device 200 receives a packet, forwarding component 205 may do a lookup of FIB 214' using the label of the received packet as a key. FIB 214' may return a set of next-hops, including the primary next-hop and any alternate next-hops (e.g., shortest path and MRT next-hops). When a topology-id label is used, forwarding component 205 may do a lookup on the topology-id label to find the correct context and then use the next label of the received packet as a key and FIB 214' may return a set of next-hops associated with that topology-id for the second label; those next-hops would be for either the blue MRT or the red MRT topology. In another approach, forwarding component 205 may do a lookup of FIB 214' using the second label of the received packet as a key. FIB 214' may return multiple sets of next-hops and the topology-id label is used to pick the appropriate set of next-hops to use.

OSPF module 216A and IS-IS module 216B may be extended to include the ability to announce additional capabilities to neighboring routers. For example, OSPF module 216A and IS-IS module 216B may be extended to announce capabilities including whether a router supports MRT, whether the router does MRT tunneling with LDP or IP or GRE or another tunneling protocol. OSPF module 216A and IS-IS module 216B may also be extended to advertise a topology association. For example, network device 200 may advertise a loopback address and associate the announced loopback address with an MRT whether blue or red. OSPF module 216A and IS-IS module 216B may also be extended to advertise common addresses with an MRT for a virtual proxy node for redundant multicast sources.

The architecture of network device 200 illustrated in FIG. 4 is shown for example purposes only. The disclosure is not limited to this architecture. In other examples, network device 200 may be configured in a variety of ways. For instance, some of the functionally of control unit 202 and forwarding component 205 may be distributed within IFCs 206. As another example, operations ascribed to control unit 202 may be performed by forwarding component, and vice versa, or by a common hardware or operating environment.

Routing process 222, forwarding component 205, or other component(s) of network device 200 may detect a failure of a primary multicast stream and re-program FIB 214' to switch to forwarding the backup multicast stream to interested receivers.

Control unit 202 and forwarding component 205 may each be implemented solely in software, or hardware, or may be implemented as combinations of software, hardware, or firmware. For example, one or more processors 213 may include processing circuitry to execute software instructions. In that case, the various software modules and protocol of control unit 202 may comprise executable instructions stored, embodied, or encoded in a computer-readable medium, such as a computer-readable storage medium, containing instructions. Instructions embedded or encoded in a computer-readable medium may cause a programmable processor, or other processor, or processing circuitry to perform operations, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random-access memory (NVRAM), Flash memory, a hard disk, a CD-ROM, a floppy disk, a cassette, magnetic media, optical media, or other computer-readable storage media.

Figure 5:
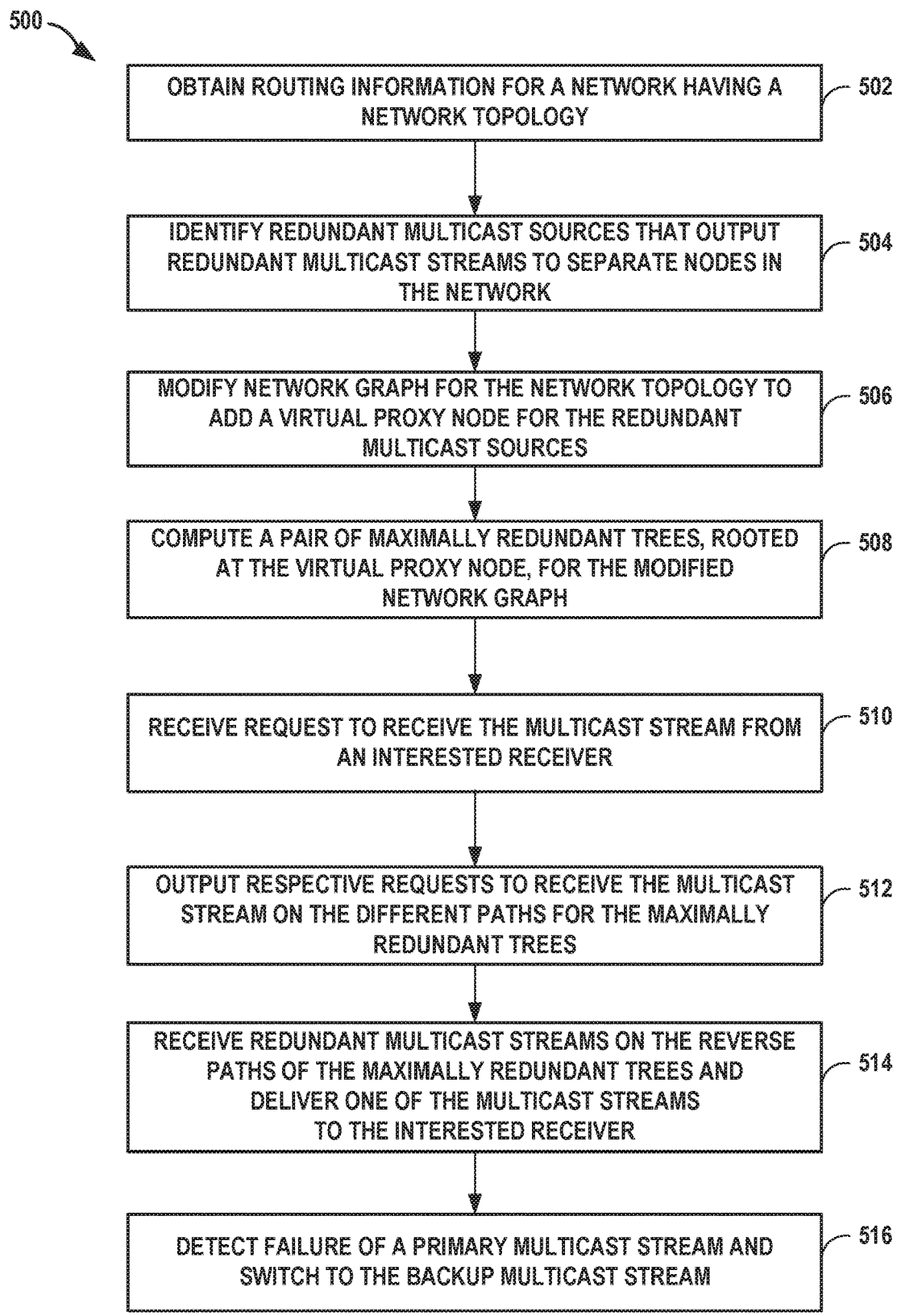
FIG. 5 is a flowchart illustrating an example mode of operation for a network device, according to techniques described in this disclosure.

FIG. 5 is a flowchart illustrating an example mode of operation for a network device, according to techniques described in this disclosure. Mode of operation 500 is described with respect to network device 200 but may be performed by other network devices described in this disclosure. Moreover, steps 502-510 may be performed by network devices that do not generate and output requests to receive the particular multicast stream, as specified in step 512.

Network device 200 executes one or more routing protocols 216 to obtain routing information for a network that includes network device 200 and having a network topology (502). Network device 200 may store the routing information to RIB 223 and/or LSDB 221. The nodes of the network are capable of delivering multicast streams using multicasting mechanisms, such as any of mLDP, PIM, or RSVP multicast. Network device 200 identifies redundant multicast sources attached to the network or within the network (such as multicast servers or anycast RPs), where the redundant multicast sources may output respective, redundant multicast streams for a multicast group (*, G) or multicast channel (S, G) to separate nodes in the network (504). For example, the redundant multicast sources may have links to different nodes on a shortest-path to the network device 200 in the network.

Based on the routing information, network device 200 generates a network graph or other representation of the network topology for the network and modifies the network graph to add a virtual proxy node that represents the redundant multicast sources (506). Network device 200 then computes a pair of maximally redundant trees, rooted at the virtual proxy node, for the modified network graph (508). Further description for example operations for performing steps 506 and 508 is provided below.

A spanning tree is defined as a tree containing links that connects all nodes in the network graph. In the context of a spanning tree computed via a depth-first search, a "back-edge" is a link that connects a descendant of a node x with an ancestor of x. A "2-connected cluster" is a maximal set of nodes that are 2-connected. The term "2-edge-connected" refers to a network graph where at least two links must be removed to partition the network. In a network graph with at least one cut-vertex, there will be multiple 2-connected clusters. The term "block" refers to a 2-connected cluster, a cut-edge, or an isolated vertex. A Directed Acyclic Graph (DAG) is a graph where all links are directed and there are no cycles in it. An Almost Directed Acyclic Graph (ADAG) is a graph that, if all links incoming to the root were removed, would be a DAG. A Generalized ADAG (GADAG) is a graph that is the combination of the ADAGs of all blocks.

Algorithms for computing a pair MRTs can handle arbitrary network topologies where the whole network graph is not 2-connected, as well as the easier case where the network graph is 2-connected. Each MRT is a spanning tree.

The pair of MRTs provide two paths from every node X to the root of the MRTs. Those paths share the minimum number of nodes and the minimum number of links. Each such shared node is a cut-vertex. Any shared links are cut-links.

Examples of such algorithms include "Common GADAG constructed with Low-point Inheritance and SPFs to find MRTs" (i.e., Low-Point Inheritance GADAG) and "Common GADAG constructed with SPFs and SPFs to find MRTs" (i.e., an SPF-based a GADAG). Additional background information is found in G. Enyedi, "Novel Algorithms for IP Fast Reroute," Department of Telecommunications and Media Informatics, Budapest University of Technology and Economics, February 2011. Additional algorithms for computing MRTs are described in Enyedi et al., "On Finding Maximally Redundant Trees in Strictly Linear Time," IEEE Symposium on Computers and Communications, 2009. Further algorithms for computing MRTs with for a network graph having a proxy node are found in U.S. Pat. No. 8,861,340, entitled "Fast Reroute Using Maximally Redundant Trees" and issued Oct. 14, 2014, which is incorporated by reference as if fully set forth herein.

A virtual proxy node is a node added to the network graph to represent redundant multicast sources, such as multicast servers outside the local MRT supporting network devices (network nodes 12 or 112) or anycast RP network devices of the network. A key property of virtual proxy nodes is that traffic cannot transit them. For MRT computation herein, the virtual proxy node for a modified network graph is the root for the MRTs and is not transited by either of the pair of MRTs. In some examples, the virtual proxy node replaces the redundant multicast sources as destinations reachable by the network with a new node connected to and reachable by the respective last-hop routers to the multicast sources, with the existing links from the last-hop routers to the multicast sources.

The set X of network nodes may compute its MRTs for one or more destinations in the modified network graph, including the virtual proxy node, V. For V specifically, determine the two loop-free neighbors inside set X whose distance to V is the shortest; these two will be referred to as NX_1 and NX_2. In the example of FIGS. 1A-1B, NX_1 and NX_2 are ingress nodes 12H and 12D, respectively. Now compute the MRTs to V that is connected to NX_1 and NX_2. In this case, the MRTs may include the outgoing interfaces from NX_1 and NX_2 to the redundant multicast sources (represented by virtual proxy node 17); a router with such an interface will remove the MRT indication from the packet but forward it out the required interface.

In some cases, such temporary or proxy nodes may be added to the network graph after the initial GADAG has been computed—including adding all the links. Each attaching router may remove the MRT marking and then forward traffic to either the redundant multicast sources outside of the island of MRT supporting routers. If there are topology-id labels, then no more is necessary.

Returning to mode of operation 500, network device 200 may be an IGMP router and receive an IGMP Join request or other request to receive a multicast stream sourced by the redundant multicast sources, where the request may be issued by an interested receiver (510). Network device 200 generates two PIM Join, mLDP Join (e.g., LDP label mapping message), or other requests to receive the multicast stream and outputs one of the requests on a path for each of the computed MRTs (512). The requests may have the same destinations (a shared anycast IP address of the sources) or in some cases different destinations (different IP addresses for redundant multicast sources). In some examples, network device 200 may perform steps 504, 506, 508 in response to receiving the request to receive the multicast stream.

Network device 200 subsequently receives a multicast stream of redundant multicast streams from the redundant multicast sources on each reverse path of the MRTs, and network device 200 forwards a primary one of the multicast streams (selected by the network device as primary) to the interested receiver (514). In response to detecting a failure of the primary multicast stream, network device 200 switches to the backup multicast stream and begins forwarding the backup multicast stream to the interested receiver (516).

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

Various aspects of this disclosure have been described. These and other aspects are within the scope of the following claims.

What is claimed is:

1. A method comprising:

by an egress network node of a network of network nodes connected according to a network topology, computing, using routing information for the network, a pair of maximally redundant trees (MRTs) from the egress network node to a virtual proxy node, with the virtual proxy node as a root of the MRTs and having respective links, in a network graph of the network topology modified to include the virtual proxy node, virtually coupling the virtual proxy node with a first network node of the network and a second network node of the network, wherein the first network node and the second network node of the network distribute, using respective redundant multicast streams, multicast content received by the first network node from a first source device and by the second network node from a second source device, wherein the first source device and second source device are redundant multicast sources for the multicast content;

outputting, by the egress network node via a path along a first MRT of the pair of MRTs, a first message requesting to receive one of the redundant multicast streams; and outputting, by the egress network node via a path along a second MRT of the pair of MRTs, a second message requesting to receive one of the redundant multicast streams.

2. The method of claim 1, wherein the first source device and the second source device are configured with a shared Internet Protocol address for sourcing the respective redundant multicast streams, and wherein the virtual proxy node has the shared Internet Protocol address in the network graph of the network topology modified to include the virtual proxy node.

3. The method of claim 1, wherein the first source device is configured with a first Internet Protocol address for sourcing a first one of the redundant multicast streams and the second source device is configured with a second, different Internet Protocol address for sourcing a second one of the redundant multicast streams, the method further comprising:

obtaining, by the egress network node, data indicating the first source device and second source device are redundant multicast sources for the multicast content; and adding, by the egress network node in response to the obtaining, the virtual proxy node to the network graph of the network topology, wherein the virtual proxy node has a third Internet Protocol address.

4. The method of claim 3, further comprising:

modifying, by the egress network node after computing the pair of MRTs, the first MRT to have a destination that is the first Internet Protocol address of the first source device; and modifying, by the egress network node after computing the pair of MRTs, the second MRT to have a destination that is the second Internet Protocol address of the second source device.

5. The method of claim 1, wherein the first source device and second source device are network nodes of the network and configured to operate as anycast rendezvous points with a shared Internet Protocol address for distributing the respective redundant multicast streams.

6. The method of claim 1, further comprising:

receiving, by the egress network node, the redundant multicast streams; and forwarding, by the egress network node, a first one of the redundant multicast streams to an interested receiver.

7. The method of claim 6, further comprising:

forwarding, by the egress network node in response to detecting a failure of the first one of the redundant multicast streams, a second one of the redundant multicast streams to the interested receiver.

8. The method of claim 1, further comprising:

obtaining, by the egress network node via one or more routing protocol messages, routing information describing the network; and generating, by the egress network node based on the routing information, the network graph of the network topology and modifying the network graph to include the virtual proxy node.

9. The method of claim 8, wherein modifying the network graph to include the virtual proxy node comprises:

adding the virtual proxy node to the network graph;

adding the link of the virtual proxy node with the first network node to the network graph; and adding the link of the virtual proxy node with the second network node to the network graph, wherein the first MRT includes the link of the virtual proxy node with the first network node, and wherein the second MRT includes the link of the virtual proxy node with the second network node.

10. The method of claim 1, further comprising:

installing, by the egress network node to a forwarding information base, a first next-hop for the path along the first MRT and outputting the first message via the first next-hop; and installing, by the egress network node to a forwarding information base, a second next-hop for the path along the second MRT and outputting the second message via the second next-hop.

11. A network device configured to operate as an egress network node of a network of network nodes connected according to a network topology, the network device comprising one or more programmable processors operably coupled to a memory and configured to:

compute, using routing information for the network, a pair of maximally redundant trees (MRTs) from the network device to a virtual proxy node, with the virtual proxy node as a root of the MRTs and having respective links, in a network graph of the network topology modified to include the virtual proxy node, virtually coupling the virtual proxy node with a first network node of the network and a second network node of the network, wherein the first network node and the second network node of the network distribute, using respective redundant multicast streams, multicast content received by the first network node from a first source device and by the second network node from a second source device, wherein the first source device and second source device are redundant multicast sources for the multicast content;

output, via a path along a first MRT of the pair of MRTs, a first message requesting to receive one of the redundant multicast streams; and output, via a path along a second MRT of the pair of MRTs, a second message requesting to receive one of the redundant multicast streams.

12. The network device of claim 11,
wherein the first source device and the second source device are configured with a shared Internet Protocol address for sourcing the respective redundant multicast streams, and
wherein the virtual proxy node has the shared Internet Protocol address in the network graph of the network topology modified to include the virtual proxy node.

13. The network device of claim 11,
wherein the first source device is configured with a first Internet Protocol address for sourcing a first one of the redundant multicast streams and the second source device is configured with a second, different Internet Protocol address for sourcing a second one of the redundant multicast streams, the network device further configured to:
obtain data indicating the first source device and second source device are redundant multicast sources for the multicast content; and
add, in response to the obtaining, the virtual proxy node to the network graph of the network topology, wherein the virtual proxy node has a third Internet Protocol address.

14. The network device of claim 13, further configured to:
modify, after computing the pair of MRTs, the first MRT to have a destination that is the first Internet Protocol address of the first source device; and
modify, after computing the pair of MRTs, the second MRT to have a destination that is the second Internet Protocol address of the second source device.

15. The network device of claim 11, wherein the first source device and second source device are network nodes of the network and configured to operate as anycast rendezvous points with a shared Internet Protocol address for distributing the respective redundant multicast streams.

16. The network device of claim 11, further configured to:
receive the redundant multicast streams; and
forward a first one of the redundant multicast streams to an interested receiver.

17. The network device of claim 16, further configured to:
forward, in response to detecting a failure of the first one of the redundant multicast streams, a second one of the redundant multicast streams to the interested receiver.

18. The network device of claim 11, further configured to:
obtain, via one or more routing protocol messages, routing information describing the network;
generate, based on the routing information, the network graph of the network topology and modifying the network graph to include the virtual proxy node.

19. The network device of claim 18, wherein to modify the network graph to include the virtual proxy node the network device is configured to:
add the virtual proxy node to the network graph;
add the link of the virtual proxy node with the first network node to the network graph; and
add the link of the virtual proxy node with the second network node to the network graph,
wherein the first MRT includes the link of the virtual proxy node with the first network node, and
wherein the second MRT includes the link of the virtual proxy node with the second network node.

20. The network device of claim 11, further configured to:
install, to a forwarding information base, a first next-hop for the path along first MRT and outputting the first message via the first next-hop; and
install, to a forwarding information base, a second next-hop for the path along the second MRT and outputting the second message via the second next-hop.

21. A non-transitory computer-readable storage medium comprising instructions that, when executed, cause one or more programmable processors, of a network device of a network of network nodes connected according to a network topology, to:
compute, using routing information for the network, a pair of maximally redundant trees (MRTs) from the network device to a virtual proxy node, with the virtual proxy node as a root of the MRTs and having respective links, in a network graph of the network topology modified to include the virtual proxy node, virtually coupling the virtual proxy node with a first network node of the network and a second network node of the network,
wherein the first network node and the second network node of the network distribute, using respective redundant multicast streams, multicast content received by the first network node from a first source device and by the second network node from a second source device,
wherein the first source device and second source device are redundant multicast sources for the multicast content;
output, by the network device via a path along a first MRT of the pair of MRTs, a first message requesting to receive one of the redundant multicast streams; and
output, by the network device via a path along a second MRT of the pair of MRTs, a second message requesting to receive one of the redundant multicast streams.

* * * * *